US011178057B2

(12) United States Patent
Yu et al.

(10) Patent No.: US 11,178,057 B2
(45) Date of Patent: Nov. 16, 2021

(54) OFFLOADING POLICY NEGOTIATION METHOD AND APPARATUS

(71) Applicant: HUAWEI TECHNOLOGIES CO., LTD., Guangdong (CN)

(72) Inventors: Youyang Yu, Shanghai (CN); Huan Li, Shanghai (CN); Hualin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 15/449,028

(22) Filed: Mar. 3, 2017

(65) Prior Publication Data

US 2017/0180259 A1 Jun. 22, 2017

Related U.S. Application Data

(63) Continuation of application No. PCT/CN2014/086073, filed on Sep. 5, 2014.

(51) Int. Cl.
*H04L 12/813* (2013.01)
*H04L 12/24* (2006.01)
(Continued)

(52) U.S. Cl.
CPC .......... *H04L 47/20* (2013.01); *H04L 41/0893* (2013.01); *H04W 28/20* (2013.01); *H04W 40/20* (2013.01); *H04W 84/12* (2013.01)

(58) Field of Classification Search
CPC ..... H04W 76/22; H04W 76/12; H04W 8/082; H04W 36/0027; H04W 74/00;
(Continued)

(56) References Cited

U.S. PATENT DOCUMENTS 8,228,861 B1 * 7/2012 Nix .................... H04W 36/00
370/329
9,326,118 B2 * 4/2016 Sym ................... H04L 12/1407
(Continued)

FOREIGN PATENT DOCUMENTS

CN 101150418 A 3/2008
CN 101895476 A 11/2010
(Continued)

OTHER PUBLICATIONS

S2-141608, titled "Revised functionality for current NB_IFOM TR", (S2-141608 hereinafter) was originally published May 19-23, 2014.*
(Continued)

*Primary Examiner* — Christopher P Grey
(74) *Attorney, Agent, or Firm* — Slater Matsil, LLP

(57) ABSTRACT

The present disclosure provides an offloading policy negotiation method and apparatus, so as to resolve problems in the prior art that a method for initiating data flow switching by UE has low applicability, and that a network side cannot control and manage the UE, and that user experience is reduced. The method includes: sending, by a first device, an offloading policy to a second device, where the offloading policy includes a default access indication and a routing rule; and receiving and storing, by the first device, an acknowledged offloading policy returned for the offloading policy by the second device, and transmitting a data flow based on the acknowledged offloading policy.

18 Claims, 11 Drawing Sheets

(51) Int. Cl.
*H04W 84/12* (2009.01)
*H04W 28/20* (2009.01)
*H04W 40/20* (2009.01)

(58) Field of Classification Search
CPC ............... H04W 76/15; H04W 88/06; H04W 36/0038; H04W 28/0263; H04W 88/16; H04W 40/20; H04W 28/20; H04W 84/12; H04L 47/20; H04L 41/0893
See application file for complete search history.

(56) References Cited

U.S. PATENT DOCUMENTS

| | | | |
|---|---|---|---|
| 9,380,446 B2* | 6/2016 | Zhou | H04W 8/02 |
| 9,521,005 B2* | 12/2016 | Kekki | H04W 48/18 |
| 10,098,129 B2* | 10/2018 | Lindoff | H04W 72/082 |
| 2008/0117859 A1* | 5/2008 | Shahidi | H04W 48/18 |
| | | | 370/328 |
| 2008/0198822 A1* | 8/2008 | Magnusson | H04L 12/14 |
| | | | 370/338 |
| 2011/0111767 A1* | 5/2011 | Livanos | H04W 28/16 |
| | | | 455/452.2 |
| 2011/0130118 A1* | 6/2011 | Fan | H04M 15/00 |
| | | | 455/411 |
| 2011/0286384 A1* | 11/2011 | Sugimoto | H04W 80/04 |
| | | | 370/328 |
| 2011/0286395 A1* | 11/2011 | Liebsch | H04W 40/18 |
| | | | 370/328 |
| 2012/0158977 A1* | 6/2012 | Zhou | H04L 12/14 |
| | | | 709/228 |
| 2013/0028193 A1 | 1/2013 | Rommer et al. | |
| 2013/0070596 A1* | 3/2013 | Yeh | H04W 36/0038 |
| | | | 370/235 |
| 2013/0114417 A1* | 5/2013 | Li | H04W 28/04 |
| | | | 370/242 |
| 2013/0275346 A1* | 10/2013 | Srikanteswara | H04W 76/10 |
| | | | 706/12 |
| 2014/0211616 A1 | 7/2014 | Salot et al. | |
| 2014/0269551 A1 | 9/2014 | Hendrickx et al. | |
| 2014/0328318 A1* | 11/2014 | Sundararajan | H04W 36/22 |
| | | | 370/331 |
| 2015/0327114 A1* | 11/2015 | Gupta | H04W 28/0263 |
| | | | 370/235 |
| 2015/0382393 A1* | 12/2015 | Kiss | H04W 76/12 |
| | | | 370/328 |
| 2016/0142954 A1* | 5/2016 | Cho | H04W 36/36 |
| | | | 370/331 |
| 2016/0277980 A1* | 9/2016 | Roeland | H04W 36/0066 |
| 2017/0201453 A1* | 7/2017 | Deng | H04W 40/00 |
| 2018/0014346 A1* | 1/2018 | Gupta | H04W 76/16 |
| 2019/0014529 A1* | 1/2019 | Karampatsis | H04W 40/248 |

FOREIGN PATENT DOCUMENTS

| | | |
|---|---|---|
| CN | 102014448 A | 4/2011 |
| CN | 102958035 A | 3/2013 |
| CN | 103181237 A | 6/2013 |
| CN | 103582079 A | 2/2014 |
| CN | 103748926 A | 4/2014 |
| WO | 2014/072569 A1 | 5/2014 |
| WO | WO2014072569 A1 * | 5/2014 |
| WO | 2014/112826 A1 | 7/2014 |

OTHER PUBLICATIONS

Qualcomm Incorporated: "Revised Functionality for Current NB_IFOM TR," 3GPP Draft; S2-141608_NB_IFOMS2B, 3$^{rd}$ Generation Partnership Project (3GPP), Mobile Competence Centre, 650 Route Des Lucioles; F-06921 Sophia Antipolis Cedex; France, vol. SA, WG2 Meeting #103, May 19, 2014, XP050804970.
Extended European Search Report dated Sep. 14, 2017 in corresponding European Patent Application No. 14901168.6.
International Search Report, dated Jun. 9, 2015, in International Application No. PCT/CN2014/086073 (4 pp.).
Chinese Office Action dated Jun. 29, 2018 in corresponding Chinese Patent Application No. 201480032643.2, 10 pgs.
3rd Generation Partnership Project; Technical Specification Group Services and System Aspects; Network based IP flow mobility (Release 13); 3GPP TR 23.861 V1.9.1 (Jul. 2014); 123 pages.
Qualcomm Incorporated, "Basic Principles for NB_IFOM solutions", SA WG2 Meeting #104 S2-142566, Jul. 7-11, 2014, 5 pages.
Qualcomm Incorporated, "UE-Initiated S2a NB_IFOM", SA WG2 Meeting #104 S2-142677, Jul. 7-11, 2014, 8 pages.

* cited by examiner

OFFLOADING POLICY NEGOTIATION METHOD AND APPARATUS

CROSS-REFERENCE TO RELATED APPLICATIONS

This application is a continuation of International Application No. PCT/CN2014/086073, filed on Sep. 5, 2014, the disclosure of which is hereby incorporated by reference in its entirety.

TECHNICAL FIELD

The present disclosure relates to the communications field, and in particular, to an offloading policy negotiation method and apparatus.

BACKGROUND

A core network of a $3^{rd}$ Generation Partnership Project (3GPP) network mainly includes three logical functional units: a mobility management entity (MME), a serving gateway (S-GW), and a packet data network gateway (P-GW). The MME is a network element for mobility management, and is responsible for non access stratum (NAS) signaling between the MME and user equipment (UE), encrypting NAS signaling, allocating a temporary identity to the UE, selecting network elements of the core network such as the S-GW and P-GW, and providing functions of roaming, tracking, security, and the like. The S-GW is a mobility anchor for handovers between local base stations eNodeBs, and provides related functions such as lawful interception. The P-GW is responsible for user address allocation, policy control, charging rules enforcement, and related functions such as lawful interception. A home subscriber server (HSS) is configured to store subscription information of a user. A policy and charging rules function (PCRF) is configured to provide policy and charging control rules.

When UE in a non-3GPP network accesses the core network of the 3GPP network, the UE may establish a connection to the P-GW in the 3GPP network by using an S2a interface, so as to access the 3GPP network, or UE establishes a connection to the P-GW in the 3GPP network by using an S2c interface.

Currently, 3GPP standard protocols allow UE to simultaneously access one 3GPP network and one non-3GPP network. In addition, further, based on a same packet data network (PDN) connection, the UE can simultaneously access the 3GPP network and the non-3GPP network, that is, different data flows on the same PDN connection may be distributed in one 3GPP network and one non-3GPP network, so that an objective of effective offloading and proper utilization of network resources is achieved.

When a new service is established, the UE may select a network according to a statically configured policy, a dynamically received policy, a user preference, or the like. The prior art provides a process of routing information synchronization and data flow movement between a network side and the current UE based on Dual Stack Mobile IPv6 (DSMIPv6). For example, in a multiple access scenario of DSMIPv6 in the current 3GPP standard protocols, a process of data flow switching initiated by the UE is as follows:

1. The UE simultaneously accesses one 3GPP network and one non-3GPP network, and uses a same PDN connection in the two networks.

2. The UE sends a Binding Update message to the network side, requesting to update routing rules.

3. The network side provides new routing rules, stores mapping relationships between updated routing addresses and access networks, and finally sends, to the UE, a Binding Acknowledgement message, indicating which updated routing rules are accepted.

4. The UE and the network side perform data flow switching based on the updated routing rules that are accepted. For example, for data flows switched to a non-3GPP system, the 3GPP network initiates a resource release process.

Mobility protocols currently used by the 3GPP include: the General Packet Radio Service Tunneling Protocol (GPRS Tunneling Protocol, GTP), Proxy Mobile IPv6 (PMIPv6), and DSMIPv6. However, only the DSMIP protocol in the current standards is applicable to a scenario of data flow movement. Therefore, the conventional method for initiating data flow switching by the UE has low applicability. In addition, because the method is controlled by the UE, but a network-side gateway cannot detect whether the UE executes a policy specified by the network side, the network side cannot control and manage the UE, and user experience is reduced.

SUMMARY

Embodiments of the present disclosure provide an offloading policy negotiation method and apparatus, so as to resolve problems in the prior art that a method for initiating data flow switching by UE has low applicability, and that a network side cannot control and manage the UE, and that user experience is reduced.

According to a first aspect, an offloading policy negotiation method includes:

sending, by a first device, an offloading policy to a second device, where the offloading policy includes at least one of the following: a default access indication or at least one routing rule; and receiving and storing, by the first device, an acknowledged offloading policy returned for the offloading policy by the second device, and transmitting a data flow based on the acknowledged offloading policy.

With reference to the first aspect, in a first possible implementation manner, the first device is a core network device or UE.

With reference to the first possible implementation manner of the first aspect, in a second possible implementation manner, before the sending, by a first device, an offloading policy to a second device, the method further includes:

generating, by the first device, the offloading policy, where the generating specifically includes:

when the first device is the core network device, generating, by the first device, the at least one routing rule as the offloading policy according to at least one of received rule information, indication information sent by the UE, local configuration information, or a current network status; or when the first device is the UE, generating, by the first device, at least one of the at least one routing rule or the default access indication as the offloading policy according to at least one of configuration information of the first device or a current network status.

With reference to the second possible implementation manner of the first aspect, in a third possible implementation manner, the routing rule includes a routing access technology, flow description information, a negotiation indication, and first routing rule identifier information, where the first routing rule identifier information is at least one of a rule name or a rule priority; or the routing rule includes a routing access technology, flow description information, a routing access technology indication, and second routing rule identifier information, where the second routing rule identifier information is at least one of a rule name or a rule priority.

With reference to the third possible implementation manner of the first aspect, in a fourth possible implementation manner, when the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

With reference to the fourth possible implementation manner of the first aspect, in a fifth possible implementation manner, when the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

With reference to the fourth or the fifth possible implementation manner of the first aspect, in a sixth possible implementation manner, a rule priority of a routing rule corresponding to a routing access technology indication that is a "forbidden" value is higher than a rule priority of a routing rule corresponding to a routing access technology indication that is an "allowed" value.

With reference to the fourth possible implementation manner of the first aspect, in a seventh possible implementation manner, when the first device is the UE, the negotiation indication in the routing rule is null; or the routing access technology indication included in the routing rule is equal to the "allowed" value.

With reference to any one of the second to the seventh possible implementation manners of the first aspect, in an eighth possible implementation manner, when the first device is the core network device, the sending, by the first device, the offloading policy to the second device, includes:

adding, by the first device, the routing rule to an Update Bearer Request or a Create Bearer Request for transmission to a mobility management entity MME, so that after the MME receives the routing rule, the MME adds the routing rule to a non-access stratum NAS message for transmission to the second device; or adding, by the first device, the routing rule to an Update Bearer Request or a Create Bearer Request for transmission to a trusted access gateway TWAG, so that after the TWAG receives the routing rule, the TWAG adds the routing rule to a specified Wireless Local Area Network Control Plane Protocol WLCP message for transmission to the second device; or adding, by the first device, the routing rule to an Update Bearer Request or a Create Bearer Request for transmission to an untrusted access gateway (for example, evolved packet data gateway, ePDG), so that after the ePDG receives the routing rule, the ePDG adds the routing rule to an Internet Key Exchange version 2 (IKEv2) message for transmission to the second device; or adding, by the first device, the routing rule to a Modify Packet Data Protocol (PDP) Context Request or a Create PDP Request for sending to the second device.

With reference to the eighth possible implementation manner of the first aspect, in a ninth possible implementation manner, the adding, by the first device, the routing rule to an Update Bearer Request or a Create Bearer Request for transmission, includes:

adding, by the first device, the routing rule as a new parameter to the Update Bearer Request or the Create Bearer Request for transmission; or adding, by the first device, the routing rule to a bearer context in the Update Bearer Request or the Create Bearer Request for transmission; or adding, by the first device, the routing rule to a protocol configuration option PCO in the Update Bearer Request or the Create Bearer Request for transmission.

With reference to the eighth possible implementation manner of the first aspect, in a tenth possible implementation manner, that the first device causes the MME to add the routing rule to a NAS message for transmission includes:

the first device causes the MME to add the routing rule as a new parameter to the NAS message for transmission; or the first device causes the MME to add the routing rule to a PCO in the NAS message for transmission.

With reference to any one of the second to the seventh possible implementation manners of the first aspect, in an eleventh possible implementation manner, when the first device is the UE, the sending, by the first device, the offloading policy to the second device, includes:

when the offloading policy includes the routing rule, adding, by the first device, the offloading policy to a NAS message for sending to an MME, so that after the MME receives the offloading policy, the MME adds the offloading policy to a Bearer Resource Command for sending to the second device; or when the offloading policy is the default access indication, adding, by the first device, the default access indication to a NAS message for sending to an MME, so that after the MME receives the default access indication, the MME adds the default access indication to a Create Session Request for sending to the second device; or adding, by the first device, the default access indication to a WLCP packet data network PDN Connection Request for sending to a TWAG so that after the TWAG receives the default access indication, the TWAG adds the default access indication to a Create Session Request for sending to the second device; or adding, by the first device, the default access indication to an IKEv2 message for sending to an untrusted access gateway ePDG, so that after the ePDG receives the default access indication, the ePDG adds the default access indication to a Create Session Request for sending to the second device.

With reference to the eleventh possible implementation manner of the first aspect, in a twelfth possible implementation manner, when the offloading policy includes the routing rule, the adding, by the first device, the offloading policy to a NAS message for sending, includes:

adding, by the first device, the offloading policy as a new parameter to the NAS message for sending; or adding, by the first device, the offloading policy to a PCO in the NAS message for sending.

With reference to the eleventh possible implementation manner of the first aspect, in a thirteenth possible implementation manner, when the offloading policy is the default access indication, the adding, by the first device, the default access indication to a NAS message or the WLCP PDN Connection Request for sending, includes:

adding, by the first device, the default access indication to a PCO in the NAS message or the WLCP PDN Connection Request for sending; or when the offloading policy is the default access indication, when the first device causes the MME or the TWAG to add the default access indication to the Create Session Request for sending, specifically configured to:

the first device causes the MME or the TWAG to add the default access indication to a PCO in the Create Session Request for sending; or when the offloading policy is the default access indication, when the first device adds the default access indication to the IKEv2 message for sending, specifically configured to:

adding, by the first device, the default access indication as a new parameter to the IKEv2 message for sending.

With reference to any one of the fourth to the sixth possible implementation manners of the first aspect, in a fourteenth possible implementation manner, when the first device is the core network device, the receiving, by the first device, an acknowledged offloading policy returned for the offloading policy by the second device, includes:

if the second device modifies at least one routing rule in the received routing rules according to at least one of configuration information of the second device or a current network status, receiving, by the first device, other routing rules and an updated routing rule that are sent by the second device, where the other routing rules are unmodified rules in the routing rules, and the updated routing rule is obtained after the at least one routing rule is modified; or if the second device does not modify the received routing rules, receiving, by the first device, the unmodified routing rules.

With reference to the fourteenth possible implementation manner of the first aspect, in a fifteenth possible implementation manner, a negotiation indication included in the at least one routing rule modified by the second device is a "negotiation allowed" identifier; or a routing access technology indication included in the at least one routing rule modified by the second device is equal to an "allowed" value.

With reference to the fourteenth possible implementation manner of the first aspect, in a sixteenth possible implementation manner, the receiving, by the first device, the acknowledged offloading policy returned for the offloading policy by the second device, further includes:

receiving a determining result generated by the second device based on the acknowledged offloading policy, in a bearer update procedure or a bearer creation or modification procedure.

With reference to any one of the fourth to the sixth possible implementation manners of the first aspect, in a seventeenth possible implementation manner, when the first device is the UE, the receiving, by the first device, the acknowledged offloading policy returned for the offloading policy by the second device, includes:

receiving, by the first device, at least one of an acknowledged routing rule or an acknowledged default access indication returned by the second device; where the receiving, by the first device, the acknowledged default access indication returned by the second device, includes:

if the second device modifies the received default access indication according to at least one of received rule information, indication information sent by the UE, local configuration information, or a current network status, receiving, by the first device, a modified default access indication returned by the second device; or if the second device does not modify the default access indication, receiving, by the first device, the unmodified default access indication returned by the second device; and the receiving, by the first device, the acknowledged routing rule returned by the second device, includes:

if the second device modifies at least one routing rule in the received routing rules according to at least one of the received rule information, the indication information sent by the UE, the local configuration information, or the current network status, receiving, by the first device, other routing rules and an updated routing rule that are sent by the second device, where the other routing rules are unmodified rules in the routing rules, and the updated routing rule is obtained after the at least one routing rule is modified; or if the second device does not modify the received routing rules, receiving, by the first device, the unmodified routing rules.

With reference to the seventeenth possible implementation manner of the first aspect, in an eighteenth possible implementation manner, a negotiation indication included in the updated routing rule obtained after the at least one routing rule is modified is a "negotiation forbidden" identifier; or a routing access technology indication included in the updated routing rule obtained after the at least one routing rule is modified is a "forbidden" value.

According to a second aspect, an offloading policy negotiation method includes:

receiving, by a second device, an offloading policy sent by a first device, and acknowledging the offloading policy, where the offloading policy includes at least one of the following: a default access indication or at least one routing rule; and storing, by the second device, an acknowledged offloading policy, returning the acknowledged offloading policy to the first device, and transmitting a data flow based on the acknowledged offloading policy.

With reference to the second aspect, in a first possible implementation manner, the second device is UE or a core network device.

With reference to the first possible implementation manner of the second aspect, in a second possible implementation manner, when the second device is the UE, the offloading policy is the at least one routing rule sent by the first device; or when the second device is the core network device, the offloading policy is at least one of the at least one routing rule or the default access indication sent by the first device.

With reference to the second possible implementation manner of the second aspect, in a third possible implementation manner, the routing rule sent by the first device includes a routing access technology, flow description information, a negotiation indication, and first routing rule identifier information, where the first routing rule identifier information is at least one of a rule name or a rule priority; or the routing rule sent by the first device includes a routing access technology, flow description information, a routing access technology indication, and second routing rule identifier information, where the second routing rule identifier information is at least one of a rule name or a rule priority.

With reference to the third possible implementation manner of the second aspect, in a fourth possible implementation manner, when the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

With reference to the fourth possible implementation manner of the second aspect, in a fifth possible implementation manner, when the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

With reference to the fourth or the fifth possible implementation manner of the second aspect, in a sixth possible implementation manner, a rule priority of a routing rule corresponding to a routing access technology indication that is a "forbidden" value is higher than a rule priority of a routing rule corresponding to a routing access technology indication that is an "allowed" value.

With reference to the fourth possible implementation manner of the second aspect, in a seventh possible implementation manner, when the first device is the UE, the negotiation indication in the routing rule sent by the first device is null; or the routing access technology indication in the routing rule sent by the first device is equal to the "allowed" value.

With reference to any one of the fifth to the seventh possible implementation manners of the second aspect, in an eighth possible implementation manner, when the second device is the UE, the acknowledging, by the second device, the offloading policy, includes:

acknowledging, by the second device, the routing rule, where the acknowledging specifically includes:

when the second device determines that at least one of configuration information of the second device or a current network status does not match at least one routing rule in the routing rules, and that the at least one routing rule is not a nonnegotiable routing rule, modifying the at least one routing rule, generating an updated routing rule after the modification, and using other routing rules that are unmodified in the routing rules and the updated routing rule that is obtained after the at least one routing rule is modified, as acknowledged routing rules; or when the second device determines that at least one of configuration information of the second device or a current network status matches all routing rules in the routing rules, or that a routing rule not matching at least one of configuration information of the second device or a current network status, in the routing rules, is a nonnegotiable routing rule, skipping modifying the routing rule, and using the unmodified routing rules as acknowledged routing rules.

With reference to any one of the fifth to the seventh possible implementation manners of the second aspect, in a ninth possible implementation manner, when the second device is the core network device, the acknowledging, by the second device, the offloading policy, includes:

acknowledging, by the second device, the default access indication in the offloading policy, and/or acknowledging, by the second device, the routing rule in the offloading policy; where the acknowledging, by the second device, the default access indication, includes:

when the second device determines that at least one of received rule information, indication information sent by the UE, local configuration information, or a current network status does not match the default access indication, modifying the default access indication, and using a modified default access indication as an acknowledged default access indication; or when the second device determines that received rule information, indication information sent by the UE, local configuration information, and a current network status match the default access indication, skipping modifying the default access indication, and using the unmodified default access indication as an acknowledged default access indication; and the acknowledging, by the second device, the routing rule, includes:

when the second device determines that at least one of the received rule information, the indication information sent by the UE, the local configuration information, or the current network status does not match at least one routing rule in the routing rules, modifying the at least one routing rule, generating an updated routing rule after the modification, and using other routing rules that are unmodified in the routing rules and the updated routing rule that is obtained after the at least one routing rule is modified, as acknowledged routing rules; or when the second device determines that the received rule information, the indication information sent by the UE, the local configuration information, and the current network status match all routing rules in the routing rules, skipping modifying the routing rules, and using the unmodified routing rules as acknowledged routing rules.

With reference to the ninth possible implementation manner of the second aspect, in a tenth possible implementation manner, the modifying, by the second device, the at least one routing rule, includes:

modifying, by the second device, a routing access technology included in the at least one routing rule; and when the at least one routing rule includes a negotiation indication, setting the negotiation indication included in the at least one routing rule to a "negotiation forbidden" identifier, or when the at least one routing rule includes a routing access technology indication, setting the routing access technology indication included in the at least one routing rule to a "forbidden" value.

With reference to the eighth possible implementation manner of the second aspect, in an eleventh possible implementation manner, when the second device is the UE, the returning, by the second device, the acknowledged offloading policy to the first device, includes:

adding, by the second device, the acknowledged routing rule to a non-access stratum NAS message for transmission to a mobility management entity MME, so that after the MME receives the acknowledged routing rule, the MME adds the acknowledged routing rule to an Update Bearer Response or a Create Bearer Response for transmission to the first device; or adding, by the second device, the acknowledged routing rule to a specified Wireless Local Area Network Control Plane Protocol WLCP message for transmission to a trusted access gateway TWAG, so that after the TWAG receives the acknowledged routing rule, the TWAG adds the acknowledged routing rule to an Update Bearer Response or a Create Bearer Response for transmission to the first device; or adding, by the second device, the acknowledged routing rule to an IKEv2 message for transmission to an untrusted access gateway ePDG, so that after the ePDG receives the acknowledged routing rule, the ePDG adds the acknowledged routing rule to an Update Bearer Response or a Create Bearer Response for transmission to the first device.

With reference to the eleventh possible implementation manner of the second aspect, in a twelfth possible implementation manner, the adding, by the second device, the acknowledged routing rule to a NAS message for transmission to an MME, includes:

adding, by the second device, the acknowledged routing rule as a new parameter to the NAS message for transmission to the MME; or adding, by the second device, the acknowledged routing rule to a protocol configuration option PCO in the NAS message for transmission to the MME.

With reference to the eleventh possible implementation manner of the second aspect, in a thirteenth possible implementation manner, the adding the acknowledged routing rule to an Update Bearer Response or a Create Bearer Response for transmission to the first device includes:

adding the acknowledged routing rule as a new parameter to the Update Bearer Response or the Create Bearer Response for transmission to the first device; or adding the acknowledged routing rule to a bearer context in the Update Bearer Response or the Create Bearer Response for transmission to the first device; or adding the acknowledged routing rule to a PCO in the Update Bearer Response or the Create Bearer Response for transmission to the first device.

With reference to any one of the eleventh to the thirteenth possible implementation manners of the second aspect, in a fourteenth possible implementation manner, the returning, by the second device, the acknowledged offloading policy to the first device, further includes:

sending a determining result generated by the second device based on the acknowledged offloading policy, in a bearer update procedure or a bearer creation or modification procedure.

With reference to the ninth possible implementation manner of the second aspect, in a fifteenth possible implementation manner, when the second device is the core network device, the returning, by the second device, the acknowledged offloading policy to the first device, includes:

when the acknowledged offloading policy includes the acknowledged routing rule, adding, by the second device, the acknowledged offloading policy to an Update Bearer Request or a Create Bearer Request for transmission to an MME, so that after the MME receives the acknowledged offloading policy, the MME adds the acknowledged offloading policy to a NAS message for transmission to the first device; or adding, by the second device, the acknowledged offloading policy to a Modify PDP Context Request or a Create PDP Context Request for sending to the first device; or when the acknowledged offloading policy is the acknowledged default access indication, adding, by the second device, the acknowledged default access indication to a Create Session Response for sending to an MME, so that after the MME receives the acknowledged default access indication, the MME adds the acknowledged default access indication to a NAS message for sending to the first device; or adding, by the second device, the acknowledged default access indication to a Create Session Response for sending to a trusted access gateway TWAG, so that after the TWAG receives the acknowledged default access indication, the TWAG adds the acknowledged default access indication to a Wireless Local Area Network Control Plane Protocol WLCP packet data network PDN Connection Response for sending to the first device; or adding, by the second device, the acknowledged default access indication to a Create Session Response for sending to an untrusted access gateway ePDG, so that after the ePDG receives the acknowledged default access indication, the ePDG adds the acknowledged default access indication to an IKEv2 message for sending to the first device.

With reference to the fifteenth possible implementation manner of the second aspect, in a sixteenth possible implementation manner, when the acknowledged offloading policy includes the acknowledged routing rule, that the second device causes the MME to add the acknowledged offloading policy to a NAS message for transmission to the first device includes:

the second device causes the MME to add the acknowledged offloading policy as a new parameter to the NAS message for transmission to the first device; or the second device causes the MME to add the acknowledged offloading policy to a PCO in the NAS message for transmission to the first device.

With reference to the fifteenth possible implementation manner of the second aspect, in a seventeenth possible implementation manner, when the acknowledged offloading policy is the acknowledged default access indication, the adding, by the second device, the acknowledged default access indication to the Create Session Response for sending, includes:

adding, by the second device, the acknowledged default access indication to a PCO in the Create Session Response for sending;

when the acknowledged offloading policy is the acknowledged default access indication, that the second device causes the MME to add the acknowledged default access indication to the NAS message for sending includes:

the second device causes the MME to add the acknowledged default access indication to a PCO in the NAS message for sending;

when the acknowledged offloading policy is the acknowledged default access indication, when the second device causes the TWAG to add the acknowledged default access indication to the WLCP PDN Connection Response for sending, specifically configured to:

the second device causes the TWAG to add the acknowledged default access indication to a PCO in the WLCP PDN Connection Response for sending; and when the acknowledged offloading policy is the acknowledged default access indication, that the second device causes the ePDG to add the acknowledged default access indication to the IKEv2 message for sending includes:

the second device causes the ePDG to add the acknowledged default access indication as a new parameter to the IKEv2 message for sending.

According to a third aspect, an offloading policy negotiation apparatus includes:

a sending unit, configured to send an offloading policy to a second device, where the offloading policy includes at least one of the following: a default access indication or at least one routing rule; and a receiving unit, configured to receive and store an acknowledged offloading policy returned for the offloading policy by the second device, and transmit a data flow based on the acknowledged offloading policy.

According to a fourth aspect, an offloading policy negotiation apparatus includes:

an acknowledging unit, configured to receive an offloading policy sent by a first device, and acknowledge the offloading policy, where the offloading policy includes at least one of the following: a default access indication or at least one routing rule; and a processing unit, configured to store an acknowledged offloading policy, return the acknowledged offloading policy to the first device, and transmit a data flow based on the acknowledged offloading policy.

In the embodiments of the present disclosure, a first device sends an offloading policy to a second device, where the offloading policy includes a default access indication and a routing rule; and the first device receives and stores an acknowledged offloading policy returned for the offloading policy by the second device, and transmits a data flow based on the acknowledged offloading policy. In this way, during updating of an offloading policy for a data flow, a routing rule that is acceptable to both sides can be obtained through negotiation between a network side and UE, transmission efficiency of the data flow is improved, and problems in the prior art that a method for initiating data flow switching by the UE has low applicability, and that the network side cannot control and manage the UE, and that user experience is reduced are resolved.

DESCRIPTION OF EMBODIMENTS

Figure 1:
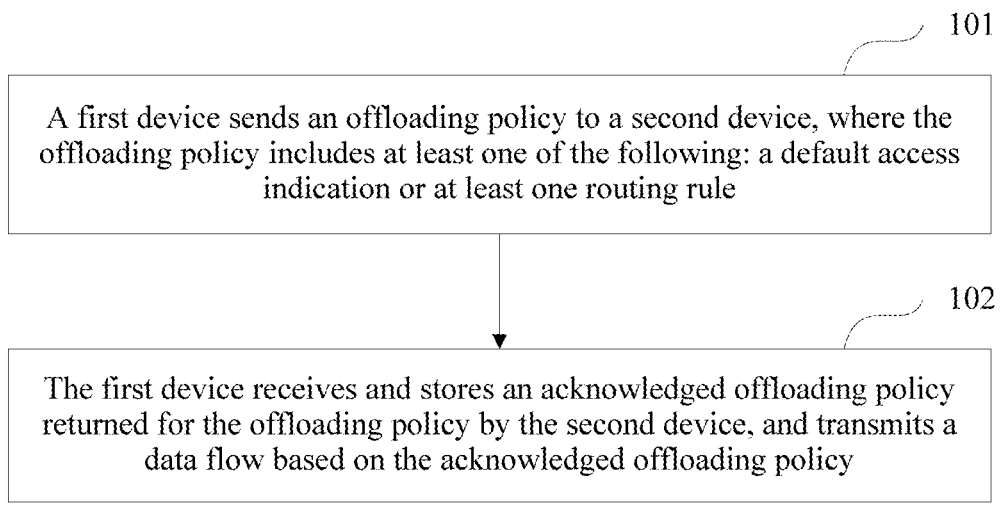
FIG. 1 is a flowchart of an offloading policy negotiation method on a first device side according to an embodiment of the present disclosure.

According to the technical solution of the present disclosure, after a first device generates a offloading policy, the first device sends the generated offloading policy to a second device. After the second device acknowledges and saves the offloading policy, the second device returns an acknowledged offloading policy to the first device. After the first device saves the acknowledged offloading policy, the first device and the second device transmit a data flow based on the acknowledged offloading policy. In this way, in a process of generating an offloading policy for a data flow, an offloading policy that is acceptable to both sides can be obtained through negotiation between a network side and UE, transmission efficiency of the data flow is improved, and problems in the prior art that a method for initiating data flow switching by the UE has low applicability, and that the network side cannot control and manage the UE, and that user experience is reduced are resolved.

In the embodiments of the present disclosure, the offloading policy includes at least one of a routing rule or a default access indication. The default access indication means that, during matching of a data flow, when no corresponding routing rule that matches the data flow is found in all locally stored routing rules, a specified access technology in the default access indication is selected for transmitting the data flow. For example, a value of the default access indication may be 3GPP, WLAN, or the like.

An embodiment of the present disclosure provides an extended routing rule. The routing rule includes a routing access technology, flow description information, a negotiation indication, and first routing rule identifier information. The first routing rule identifier information is at least one of a rule name or a rule priority. Optionally, the routing rule may further include a routing access technology priority. In this embodiment, for example, the routing rule includes only the routing access technology, the flow description information, the negotiation indication, the rule name, and the rule priority, as shown in Table 1.

TABLE 1

First extended routing rule

| Rule name | Routing access technology | Rule priority | Flow description information | Negotiation indication |
|---|---|---|---|---|
| 1 | 3GPP | a | Data flow description information 1 | 0 |
| 2 | 3GPP | b | Data flow description information 2 | 1 |
| 3 | WLAN | c | Data flow description information 3 | 1 |

The rule name may uniquely identify each routing rule (namely, a routing entry).

The routing access technology in each routing rule is an access technology identifier recommended by the routing rule, and its value may be 3GPP, WLAN, non-3GPP, WiMax, or the like.

The rule priority reflects a priority relationship between different routing rules, and may be defined as an integer. A smaller value indicates a higher priority.

The flow description information indicates data flow description information. Specifically, the data flow description information may include at least one parameter such as a source or destination IP address, a source or destination port number, a protocol type, or the like.

The negotiation indication is used to implement routing rule negotiation. The negotiation indication is used to identify permission of the UE for modifying the routing rule, and a value is a "negotiation allowed" identifier or a "negotiation forbidden" identifier. When the value of the negotiation indication is the "negotiation allowed" identifier, it indicates that the UE may select the routing access technology in the routing rule or may select another access technology. When the value of the negotiation indication is the "negotiation forbidden" identifier, it indicates that the UE can select only the routing access technology in the routing rule. Specifically, the negotiation indication is used to indicate whether the current routing rule can by modified by the UE. The negotiation indication may generally have two values: the "negotiation allowed" identifier and the "negotiation forbidden" identifier, and may be defined as a Boolean value but is not limited thereto. In this embodiment, the Boolean value is used only as an example. For a specific routing rule, if a value of a negotiation indication is 1, it indicates that the routing rule allows negotiation, that is, the UE is allowed to modify the routing rule; or if a value of a negotiation indication is 0, it indicates that the routing rule does not allow negotiation, that is, the UE is not allowed to modify the routing rule. Therefore, 1 indicates that negotiation is allowed, and 0 indicates that negotiation is forbidden.

When the value of the negotiation indication is the "negotiation forbidden" identifier, it indicates that the routing rule to which the negotiation indication belongs is a nonnegotiable routing rule.

When an access technology is selected for transmitting a data flow, the access technology used for transmitting the data flow may be determined according to the routing rule in Table 1.

Specifically, a feature of a received data flow is obtained; matching is performed according to the obtained feature of the data flow and flow description information of a locally stored routing rule; and a routing rule including flow description information corresponding to the feature of the data flow is used as a candidate routing rule.

When a quantity of obtained candidate routing rules is 0, a routing access technology set in the locally stored default access indication is selected for transmitting the data flow.

When the quantity of obtained candidate routing rules is 1, a routing access technology included in the routing rule is directly selected for transmitting the data flow.

When the quantity of obtained candidate routing rules is greater than 1, a routing rule with a highest rule priority in the candidate routing rules may be selected as a target routing rule, and a routing access technology included in the target routing rule is selected for transmitting the data flow.

Still using the routing rule in Table 1 as an example, if the feature of the data flow received by the UE is a data flow matching data flow description information 1, a routing rule with a rule name 1 is retrieved from the locally stored routing rules, and the data flow is transmitted according to a routing access technology 3GPP specified in the routing rule.

This embodiment of the present disclosure further provides another extended routing rule. The routing rule includes a routing access technology, flow description information, a routing access technology indication, and second routing rule identifier information, where the second routing rule identifier information is at least one of a rule name or a rule priority. In this embodiment, for example, the routing rule includes the routing access technology, the flow description information, the rule name, the routing access technology indication, and the rule priority, as shown in Table 2.

TABLE 2

Second extended routing rule

| Rule name | Routing access technology | Routing access technology indication | Rule priority | Flow description information |
|---|---|---|---|---|
| 1 | 3GPP | x | a | Data flow description information 1 |
| 2 | 3GPP | x | b | Data flow description information 2 |
| 3 | WLAN | y | c | Data flow description information 3 |
| 4 | 3GPP | y | d | Data flow description information 4 |

Meanings of the rule name, the routing access technology, the rule priority, and the flow description information are the same as those in the first extended routing rule, and are not described again herein.

In the first extended routing rule provided by this embodiment of the present disclosure, routing rule negotiation is implemented by setting the negotiation indication. In the second extended routing rule provided by this embodiment of the present disclosure, routing rule negotiation is implemented by using the routing access technology indication.

The routing access technology indication reflects whether using the routing access technology is allowed or forbidden. The routing access technology indication is used to identify permission for using the routing access technology in the routing rule. When a value of the routing access technology indication is a "forbidden" value, it indicates that using the routing access technology in the routing rule is forbidden. When the value of the routing access technology indication is an "allowed" value, it indicates that using the routing access technology in the routing rule is allowed. When the value of the routing access technology indication is the "forbidden" value, it indicates that the routing rule to which the routing access technology indication belongs is a nonnegotiable routing rule. A rule priority of a routing rule corresponding to a routing access technology indication that is a "forbidden" value is higher than a rule priority of a routing rule corresponding to a routing access technology indication that is an "allowed" value. Specifically, when the routing access technology indication is "allowed", it indicates that a data flow matching the flow description information may be transmitted by using the access technology indicated in the routing access technology. Conversely, when the routing access technology indication is "forbidden", it indicates that using the access technology indicated in the routing access technology to transmit the data flow matching the flow description information is forbidden. In this embodiment, still using the Boolean value as an example, when the value is 1, it indicates that using the corresponding routing access technology for transmission is allowed; or when the value is 0, it indicates that using the routing access technology for transmission is forbidden. In addition, when the value is 0, the UE needs to strictly comply with the policy indication, and transmission of the matched data flow in the corresponding access technology is forbidden, that is, the policy cannot be modified by the UE, and this is a policy forbidding negotiation. Conversely, if the value is 1, the UE may also select another access technology to transmit the matched data flow, and this is a policy allowing negotiation.

When the value of the routing access technology indication is the "forbidden" value, it indicates that the routing rule to which the routing access technology indication belongs is a nonnegotiable routing rule.

Further, if a received data flow matches a nonnegotiable routing rule in which a value of a routing access technology indication is 0, a routing access technology different from a routing access technology included in the nonnegotiable routing rule is selected for transmitting the data flow. The UE cannot modify the nonnegotiable routing rule, but can modify a routing rule allowing negotiation in which a value of a routing access technology indication is 1. That is, the UE needs to use another routing access technology different from the routing access technology specified in the nonnegotiable routing rule, for transmitting the data flow, or may use a routing access technology specified in the routing rule allowing negotiation, for transmitting the data flow, or may use another routing access technology different from a routing access technology specified in the routing rule allowing negotiation, for transmitting the data flow.

When an access technology is selected for transmitting a data flow, the access technology used for transmitting the data flow may be determined according to the routing rule in Table 2.

Specifically, a feature of a received data flow is obtained; matching is performed according to the obtained feature of the data flow and flow description information of a locally stored routing rule; and a routing rule including flow description information corresponding to the feature of the data flow is used as a candidate routing rule.

When a quantity of obtained candidate routing rules is 0, a routing access technology set in the locally stored default access indication is selected for transmitting the data flow.

When the quantity of candidate routing rules is 1, and a routing access technology indication is not a specified value 0, the data flow is transmitted according to a routing access technology included in the candidate routing rule. If a device receiving the data flow is UE, the UE may further use another routing access technology to transmit the data flow.

When the quantity of candidate routing rules is 1, and the routing access technology indication is the specified value 0, that is, the candidate routing rule is a nonnegotiable routing rule, a routing access technology different from the routing access technology included in the nonnegotiable routing rule is selected for transmitting the data flow.

When the quantity of candidate routing rules is greater than 1, a routing rule with a highest rule priority in the candidate routing rules may be selected as a target routing rule, and the data flow is transmitted according to a routing access technology included in the target routing rule.

Generally, a rule priority of a nonnegotiable routing rule may be set to be higher than a rule priority of a routing rule allowing negotiation, that is, a rule priority of a routing rule corresponding to a routing access technology indication that is a "forbidden" value is higher than a rule priority of a routing rule corresponding to a routing access technology indication that is an "allowed" value.

An embodiment of the present disclosure provides an offloading policy negotiation method applicable to UE and a network-side device such as a P-GW, for processing a data flow switching service. The following describes implementation manners of the present disclosure with reference to accompanying drawings in detail.

Referring to FIG. 1, a specific processing procedure of an offloading policy negotiation method provided by an embodiment of the present disclosure includes the following steps:

Step 101: A first device sends an offloading policy to a second device, where the offloading policy includes at least one of the following: a default access indication or at least one routing rule.

The offloading policy sent by the first device is generally a offloading policy generated by the first device.

Offload policies generated by the first device may include a created offloading policy and a new offloading policy obtained by modifying an original offloading policy.

The first device is a device that transmits a data flow according to the offloading policy, and specifically, may be a core network device (such as a P-GW) or UE. In this embodiment, for example, the first device is a P-GW or UE.

Likewise, the second device is also a device that transmits a data flow according to the offloading policy. Because the first device and the second device perform routing rule negotiation, when the first device is a core network device, the second device is UE; when the first device is UE, the second device is a core network device.

Because the first device may be a core network device or UE, the first device generates the offloading policy in two manners.

In the first manner, when the first device is the core network device, the first device generates or modifies the at least one routing rule as the offloading policy according to at least one of received rule information (for example, a PCC rule sent by a PCRF, or indication information sent by the UE), local configuration information, or a current network status; or in the second manner, when the first device is the UE, the first device generates or modifies at least one of the at least one routing rule or the default access indication as the offloading policy according to at least one of configuration information of the first device or a current network status.

Specifically, when the first device is the core network device, for example, the P-GW, the P-GW may decide to create or modify a routing rule based on at least one of the rule information (such as a PCC rule) delivered by the PCRF, the indication information (such as a default access indication sent by the UE) sent by the UE, the local configuration information, the current network status, or the like. The foregoing information specifies, for example, that some data flows needs to be transmitted through a 3GPP network, or includes the current network status, for example, a smooth 3GPP network, a non-3GPP network fault, poor signal quality, or the like.

When the second device is the UE, an access technology is selected according to configuration information of the UE, for example, a specific application set by a user in the UE. When the application runs, the UE generates or modifies a routing rule according to the foregoing configuration information of the UE and the current network status.

In this embodiment, two forms of new extended routing rules are defined, for example, extended routing rules in the foregoing Table 1 and Table 2.

In the first form, the routing rule generated by the first device includes a routing access technology, flow description information, a negotiation indication, and first routing rule identifier information. The first routing rule identifier information is at least one of a rule name or a rule priority.

In the second form, the routing rule generated by the first device includes a routing access technology, flow description information, a routing access technology indication, and second routing rule identifier information, where the second routing rule identifier information is at least one of a rule name or a rule priority.

To better implement routing rule negotiation, in this embodiment, the routing rule including the routing access technology, the flow description information, the negotiation indication, the rule name, and the rule priority in the first form is used only as an example; and the routing rule including the routing access technology, the flow description information, the rule name, the routing access technology indication, and the rule priority in the second form is used only as an example.

When the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

When the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

A rule priority of a routing rule corresponding to a routing access technology indication that is a "forbidden" value is higher than a rule priority of a routing rule corresponding to a routing access technology indication that is an "allowed" value.

When the first device is the UE, the negotiation indication in the routing rule generated by the first device is null; or the routing access technology indication included in the routing rule generated by the first device is equal to the "allowed" value.

Specifically, when the first device is the core network device (such as the P-GW), the offloading policy generated or modified by the first device is the routing rule, and that the first device sends the offloading policy to the second device includes:

the first device adds the routing rule to an Update Bearer Request or a Create Bearer Request for transmission to an MME, so that after the MME receives the routing rule, the MME adds the routing rule to a NAS message for transmission to the second device; or the first device adds the routing rule to an Update Bearer Request or a Create Bearer Request for transmission to a TWAG, so that after the TWAG receives the routing rule, the TWAG adds the routing rule to a specified Wireless Local Area Network Control Plane Protocol WLCP message for transmission to the second device; or the first device adds the routing rule to an Update Bearer Request or a Create Bearer Request for transmission to an untrusted access gateway (ePDG), so that after the ePDG receives the routing rule, the ePDG adds the routing rule to an IKEv2 message for transmission to the second device; or the first device adds the routing rule to a Modify PDP Context Request or a Create PDP Request for sending to the second device.

The specified WLCP message includes a WLCP NB_IFOM Request/Response message, a WLCP Create Bearer Request/Response, a WLCP Update Bearer Request/Response, or the like. If the generated routing rule is sent by a non-3GPP side (such as a TWAN network) to the UE, a message between a trusted WLAN access network (TWAN) and the UE needs to be customized as a signaling message. For example, a WLCP NB_IFOM Request/Response message is defined, and then the generated routing rule is added to the message for sending to the UE.

The routing rule may be transmitted in the Update Bearer Request or the Create Bearer Request in the following several manners:

In the first manner, the first device adds the routing rule as a new parameter to the Update Bearer Request or the Create Bearer Request for transmission.

In the second manner, the first device adds the routing rule to a bearer context in the Update Bearer Request or the Create Bearer Request for transmission.

In the third manner, the first device adds the routing rule to a protocol configuration option (PCO) in the Update Bearer Request or the Create Bearer Request for transmission.

The routing rule is transmitted in the NAS message in the following two manners:

In the first manner, the first device causes the MME to add the routing rule as a new parameter to the NAS message for transmission, that is, the routing rule may be transmitted as a separate parameter in the NAS message.

In the second manner, the first device causes the MME to add the routing rule to a PCO in the NAS message for transmission.

Preferably, after the routing rule is transmitted in the PCO stored in the Update Bearer Request or the Create Bearer Request to the MME, the MME continues to store the routing rule in the PCO in the NAS message for transmission.

Specifically, when the first device is the UE, the offloading policy generated by the first device includes the at least one of the routing rule and the default access indication. That the first device sends the generated offloading policy to the second device includes:

when the offloading policy includes the routing rule, the first device adds the offloading policy to a NAS message for sending to an MME, so that after the MME receives the offloading policy, the MME adds the offloading policy to a Bearer Resource Command for sending to the second device; or when the offloading policy is the default access indication, the first device adds the default access indication to a NAS message for sending to an MME, so that after the MME receives the default access indication, the MME adds the default access indication to a Create Session Request for sending to the second device; or the first device adds the default access indication to a WLCP PDN Connection Request for sending to a TWAG, so that after the TWAG receives the default access indication, the TWAG adds the default access indication to a Create Session Request for sending to the second device; or the first device adds the default access indication to an IKEv2 message for sending to an untrusted access gateway (ePDG), so that after the ePDG receives the default access indication, the ePDG adds the default access indication to a Create Session Request for sending to the second device.

When the offloading policy includes the routing rule, the first device adds the offloading policy as a new parameter to the NAS message for sending, or the first device adds the offloading policy to a PCO in the NAS message for sending. That is, the offloading policy may be transmitted as a separate parameter in the NAS message, or may be stored in the PCO in the NAS message for transmission.

When the offloading policy is the default access indication, the adding the default access indication to a NAS message, a Create Session Request, or a WLCP PDN Connection Request for sending, includes: adding the default access indication to a PCO in the NAS message, the Create Session Request, or the WLCP PDN Connection Request for sending; and the adding the default access indication to an IKEv2 message for sending includes: adds the default access indication as a new parameter to the IKEv2 message for sending.

Step 102: The first device receives and stores an acknowledged offloading policy returned for the offloading policy by the second device, and transmits a data flow based on the acknowledged offloading policy.

Specifically, when the first device is the core network device, the offloading policy generated by the first device is the routing rule. Therefore, the acknowledged offloading policy is an acknowledged routing rule. That the first device receives an acknowledged offloading policy returned by the second device includes:

if the second device modifies at least one routing rule in the received routing rules according to at least one of configuration information of the second device or a current network status, the first device receives other routing rules and an updated routing rule that are sent by the second device, where the other routing rules are unmodified rules in the routing rules, and the updated routing rule is obtained after the at least one routing rule is modified; or if the second device does not modify the received routing rules, the first device receives the unmodified routing rules.

When the second device returns the unmodified routing rules, the second device may return the unmodified routing rules, or may return only identifiers of the unmodified routing rules.

Specifically, modifying a routing rule is modifying a routing access technology in the routing rule.

A negotiation indication included in the at least one routing rule modified by the second device is a "negotiation allowed" identifier; or a routing access technology indication included in the at least one routing rule modified by the second device is equal to an "allowed" value, that is, when the second device (UE) acknowledges a routing rule, the second device can modify only a routing rule that is set as UE-modifiable.

Optionally, in a process in which a network side performs offloading policy negotiation by using a bearer update procedure or a bearer creation procedure, that the first device receives an acknowledged offloading policy returned for the offloading policy by the second device further includes:

receiving a determining result generated by the second device based on the acknowledged offloading policy, in the bearer update procedure or the bearer creation or modification procedure.

The determining result includes: the UE accepts the bearer update procedure or the bearer creation or modification procedure initiated by the network side, or the UE does not accept the bearer update procedure or the bearer creation or modification procedure initiated by the network side. The determining result further includes a special cause value of the UE, for example, UE refuse, IP traffic remove, or N3GPP preferred.

Specifically, when the first device is the UE, the offloading policy generated by the first device includes the at least one of the routing rule or the default access indication. That the first device receives an acknowledged offloading policy returned for the offloading policy by the second device includes:

the first device receives at least one of an acknowledged routing rule or an acknowledged default access indication returned by the second device.

That the first device receives an acknowledged default access indication returned by the second device includes:

if the second device modifies the received default access indication according to at least one of received rule information, local configuration information, or a current network status, the first device receives a modified default access indication returned by the second device; or if the second device does not modify the default access indication, the first device receives the unmodified default access indication returned by the second device.

That the first device receives an acknowledged routing rule returned by the second device includes:

if the second device modifies at least one routing rule in the received routing rules according to at least one of the received rule information, the local configuration information, or the current network status, the first device receives other routing rules and an updated routing rule that are sent by the second device, where the other routing rules are unmodified rules in the routing rules, and the updated routing rule is obtained after the at least one routing rule is modified; or if the second device does not modify the received routing rules, the first device receives the unmodified routing rules.

A negotiation indication included in the updated routing rule obtained after the at least one routing rule is modified is a "negotiation forbidden" identifier; or a routing access technology indication included in the updated routing rule obtained after the at least one routing rule is modified is a "forbidden" value.

In this way, after receiving the routing rule generated by the UE, the network side acknowledges the routing rule, that is, when the network side does not allow a routing access technology to transmit a data flow, the network side forcibly modifies the corresponding routing rule, and sets an updated routing rule after the modification, as forbidding the UE to modify the routing rule again. The UE needs to transmit the data flow according to the routing rule.

Figure 2:
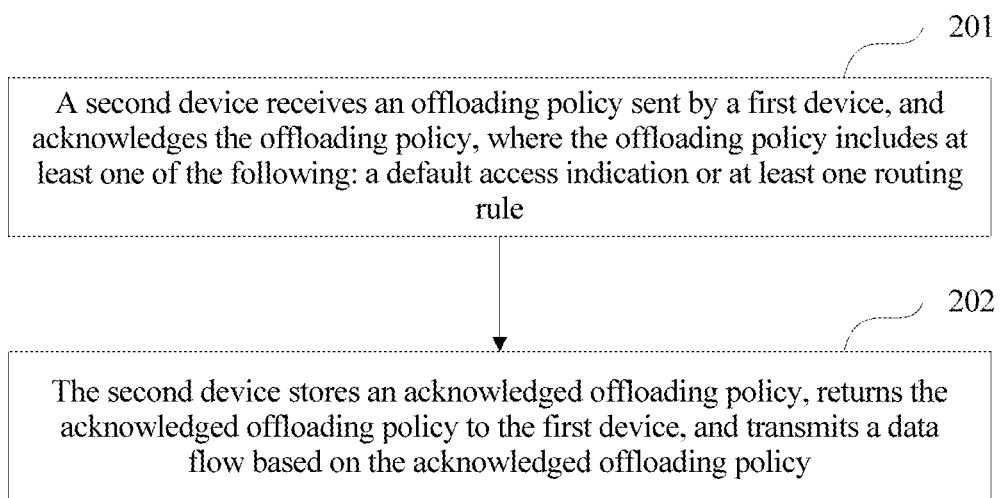
FIG. 2 is a flowchart of an offloading policy negotiation method on a second device side according to an embodiment of the present disclosure.

Based on the foregoing embodiment, referring to FIG. 2, an embodiment of the present disclosure further provides an offloading policy negotiation method. A specific processing procedure includes the following steps:

Step 201: A second device receives an offloading policy sent by a first device, and acknowledges the offloading policy, where the offloading policy includes at least one of the following: a default access indication or at least one routing rule.

The second device is a device that transmits a data flow according to the offloading policy, and specifically, may be a core network device (such as a P-GW) or UE. In this embodiment, for example, the second device is a P-GW or UE.

Likewise, the first device is also a device that transmits a data flow according to the offloading policy. Because the first device and the second device perform routing rule negotiation, when the second device is a core network device, the first device is UE; when the second device is UE, the first device is a core network device.

When the second device is the UE, the offloading policy received by the second device is the at least one routing rule sent by the first device; or when the second device is the core network device, the offloading policy received by the second device is at least one of the at least one routing rule or the default access indication sent by the first device.

The routing rule sent by the first device includes two forms.

In the first form, the routing rule sent by the first device includes a routing access technology, flow description information, a negotiation indication, and first routing rule identifier information, where the first routing rule identifier information is at least one of a rule name or a rule priority; or in the second form, the routing rule sent by the first device includes a routing access technology, flow description information, a routing access technology indication, and second routing rule identifier information, where the second routing rule identifier information is at least one of a rule name or a rule priority.

To better implement routing rule negotiation, in this embodiment, the routing rule including the routing access technology, the flow description information, the negotiation indication, the rule name, and the rule priority in the first form is used only as an example; and the routing rule including the routing access technology, the flow description information, the rule name, the routing access technology indication, and the rule priority in the second form is used only as an example.

When the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

When the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

A rule priority of a routing rule corresponding to a routing access technology indication that is a "forbidden" value is higher than a rule priority of a routing rule corresponding to a routing access technology indication that is an "allowed" value.

When the first device is the UE, the negotiation indication in the routing rule sent by the first device is null; or the routing access technology indication included in the routing rule sent by the first device is equal to the "allowed" value.

Specifically, when the second device is the UE, the offloading policy received by the second device is the routing rule sent by the first device; and that the second device acknowledges the offloading policy includes:

the second device acknowledges the routing rule, where the acknowledging specifically includes:

when the second device determines that at least one of configuration information of the second device or a current network status does not match at least one routing rule in the routing rules, and that the at least one routing rule is not a nonnegotiable routing rule, modifying the at least one routing rule, generating an updated routing rule after the modification, and using other routing rules that are unmodified in the routing rules and the updated routing rule that is obtained after the at least one routing rule is modified, as acknowledged routing rules; or when the second device determines that at least one of configuration information of the second device or a current network status matches all routing rules in the routing rules, or that a routing rule not matching at least one of configuration information of the second device or a current network status, in the routing rules, is a nonnegotiable routing rule, skipping modifying the routing rule, and using the unmodified routing rules as acknowledged routing rules.

Specifically, when the second device is the core network device, the offloading policy received by the second device is the at least one of the routing rule or the default access indication sent by the first device; and that the second device acknowledges the offloading policy includes:

the second device acknowledges the default access indication in the offloading policy, and/or the second device acknowledges the routing rule in the offloading policy.

That the second device acknowledges the default access indication includes:

when the second device determines that at least one of received rule information, indication information sent by the UE, local configuration information, or a current network status does not match the default access indication, the second device modifies the default access indication, and uses a modified default access indication as an acknowledged default access indication; or when the second device determines that received rule information, indication information sent by the UE, local configuration information, and a current network status match the default access indication, the second device skips modifying the default access indication, and uses the unmodified default access indication as an acknowledged default access indication.

That the second device acknowledges the routing rule includes:

when the second device determines that at least one of the received rule information, the indication information sent by the UE, the local configuration information, or the current network status does not match at least one routing rule in the routing rules, the second device modifies the at least one routing rule, generates an updated routing rule after the modification, and uses other routing rules that are unmodified in the routing rules and the updated routing rule that is obtained after the at least one routing rule is modified, as acknowledged routing rules; or when the second device determines that the received rule information, the indication information sent by the UE, the local configuration information, and the current network status match all routing rules in the routing rules, the second device skips modifying the routing rules, and uses the unmodified routing rules as acknowledged routing rules.

That the second device modifies the at least one routing rule includes:

the second device modifies a routing access technology included in the at least one routing rule; and when the at least one routing rule includes a negotiation indication, the second device sets the negotiation indication included in the at least one routing rule to a "negotiation forbidden" identifier, or when the at least one routing rule includes a routing access technology indication, the second device sets the routing access technology indication included in the at least one routing rule to a "forbidden" value.

Step 202: The second device stores an acknowledged offloading policy, returns the acknowledged offloading policy to the first device, and transmits a data flow based on the acknowledged offloading policy.

In comparison with received new routing rules generated by the first device, a quantity of routing rules acknowledged by the second device is unchanged, except that some routing rules are modified.

Specifically, when the second device is the UE, the acknowledged offloading policy is the acknowledged routing rule. That the second device returns the acknowledged offloading policy to the first device includes:

the second device adds the acknowledged routing rule to a NAS message for transmission to an MME, so that after the MME receives the acknowledged routing rule, the MME adds the acknowledged routing rule to an Update Bearer Response or a Create Bearer Response for transmission to the first device; or the second device adds the acknowledged routing rule to a specified WLCP message for transmission to a TWAG, so that after the TWAG receives the acknowledged routing rule, the TWAG adds the acknowledged routing rule to an Update Bearer Response or a Create Bearer Response for transmission to the first device; or the second device adds the acknowledged routing rule to an IKEv2 message for transmission to an ePDG, so that after the ePDG receives the acknowledged routing rule, the ePDG adds the acknowledged routing rule to an Update Bearer Response or a Create Bearer Response for transmission to the first device.

That the second device adds the acknowledged routing rule to a NAS message for transmission to an MME includes:

the second device adds the acknowledged routing rule as a new parameter to the NAS message for transmission to the MME; or the second device adds the acknowledged routing rule to a PCO in the NAS message for transmission to the MME.

That the MME adds the acknowledged routing rule to an Update Bearer Response or a Create Bearer Response for transmission to the first device includes:

the MME adds the acknowledged routing rule as a new parameter to the Update Bearer Response or the Create Bearer Response for transmission to the first device; or the MME adds the acknowledged routing rule to a bearer context in the Update Bearer Response or the Create Bearer Response for transmission to the first device; or the MME adds the acknowledged routing rule to a PCO in the Update Bearer Response or the Create Bearer Response for transmission to the first device.

Optionally, that the second device returns the acknowledged offloading policy to the first device further includes:

sending a determining result generated by the second device based on the acknowledged offloading policy, in a bearer update procedure or a bearer creation or modification procedure.

Specifically, when the second device is the core network device, the acknowledged offloading policy includes at least one of the acknowledged routing rule or the acknowledged default access indication, that the second device returns the acknowledged offloading policy to the first device includes:

when the acknowledged offloading policy includes the acknowledged routing rule, the second device adds the acknowledged offloading policy to an Update Bearer Request or a Create Bearer Request for transmission to an MME, so that after the MME receives the acknowledged offloading policy, the MME adds the acknowledged offloading policy to a NAS message for transmission to the first device; or the second device adds the acknowledged offloading policy to a Modify PDP Context Request or a Create PDP Context Request for sending to the first device; or when the acknowledged offloading policy is the acknowledged default access indication, the second device adds the acknowledged default access indication to a Create Session Response for sending to an MME, so that after the MME receives the acknowledged default access indication, the MME adds the acknowledged default access indication to a NAS message for sending to the first device; or the second device adds the acknowledged default access indication to a Create Session Response for sending to a TWAG, so that after the TWAG receives the acknowledged default access indication, the TWAG adds the acknowledged default access indication to a WLCP PDN Connection Response for sending to the first device; or the second device adds the acknowledged default access indication to a Create Session Response for sending to an ePDG, so that after the ePDG receives the acknowledged default access indication, the ePDG adds the acknowledged default access indication to an IKEv2 message for sending to the first device.

When the acknowledged offloading policy includes the acknowledged routing rule, the adding the acknowledged offloading policy to a NAS message for transmission to the first device includes:

adding the acknowledged offloading policy as a new parameter to the NAS message for transmission to the first device; or adding the acknowledged offloading policy to a PCO in the NAS message for transmission to the first device.

When the acknowledged offloading policy is the acknowledged default access indication, the adding the acknowledged default access indication to a NAS message, a Create Session Response, or a WLCP PDN Connection Response for sending includes:

adding the acknowledged default access indication to a PCO in the NAS message, the Create Session Response, or the WLCP PDN Connection Response for sending; or when the acknowledged offloading policy is the acknowledged default access indication, the adding the acknowledged default access indication to an IKEv2 message for sending includes:

adding the acknowledged default access indication as a new parameter to the IKEv2 message for sending.

Based on the routing rule negotiation method provided in the foregoing embodiment, the embodiments of the present disclosure further provide specific examples of routing rule negotiation in five different scenarios.

Figure 3A:
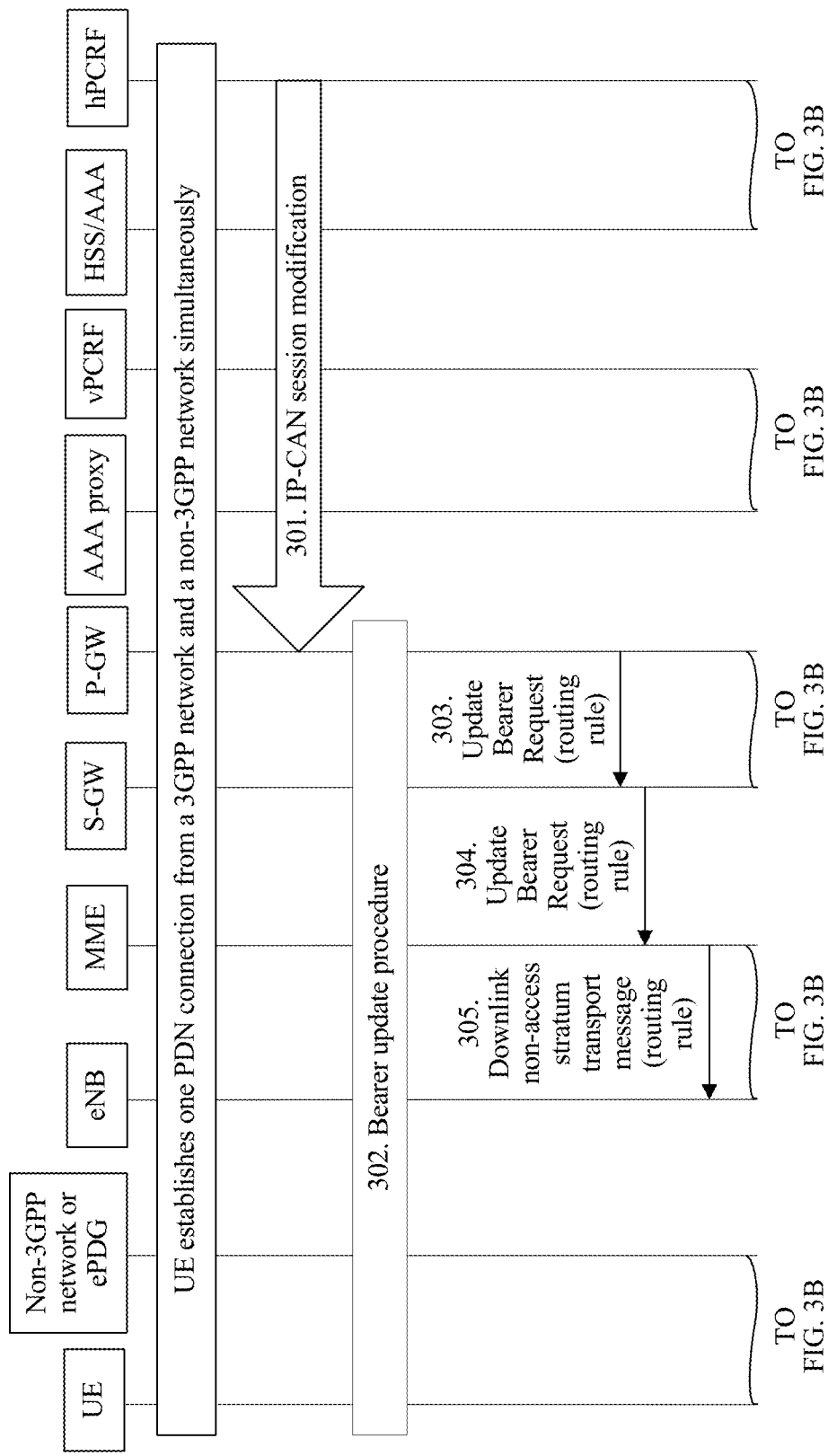
FIG. 3A and FIG. 3B are a flowchart of a first offloading policy negotiation example according to an embodiment of the present disclosure.
Figure 3B:
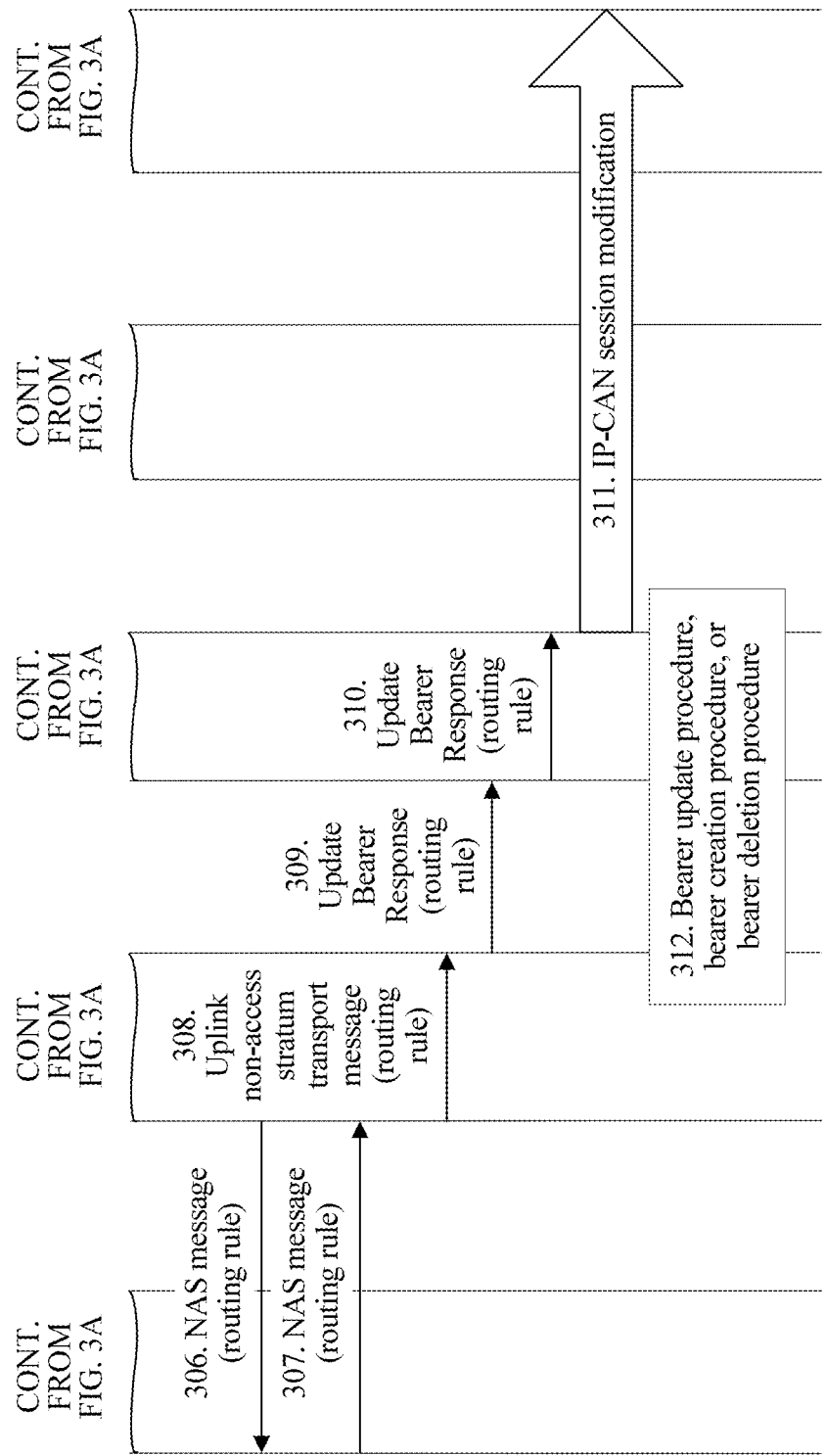

In an example 1, an embodiment of the present disclosure provides a routing rule negotiation mechanism initiated by a network side. The network side and UE perform routing rule negotiation by using a bearer update procedure. Referring to FIG. 3A and FIG. 3B, a specific procedure for routing rule negotiation is as follows:

First, the UE establishes one PDN connection from a 3GPP network and a non-3GPP network simultaneously. Multiple data flows exists between the UE and a P-GW.

Step 301: A home PCRF (hPCRF) initiates an IP connectivity access network session modification (IP-CAN Session Modification) process, and modifies parameters of some data flows, for example, modifies a routing access technology of a data flow from 3GPP to non-3GPP.

Step 302: A P-GW decides to create or modify a routing rule based on at least one of rule information (such as a charging policy) delivered by the hPCRF, indication information sent by UE, local configuration information, a current network status, or the like, so as to generate a new routing rule. The P-GW initiates a bearer update procedure according to the new routing rule, that is, sends an Update Bearer Request, and sends the new routing rule generated by the P-GW to the UE.

The new routing rule generated by the P-GW is, for example, the first extended routing rule or the second extended routing rule provided by the foregoing embodiment. A quantity of new routing rules generated by the P-GW may be one or more.

The bearer update procedure may be triggered on a 3GPP side, or may be triggered on a non-3GPP side, or may be triggered on both a 3GPP side and a non-3GPP side. This is not limited in this embodiment of the present disclosure. In this embodiment, the bearer update procedure performed on the 3GPP side is used only as an example.

Step 303: The P-GW sends, on a 3GPP side, an Update Bearer Request message to an S-GW, where the Update Bearer Request carries the new routing rule generated by the P-GW.

In this embodiment of the present disclosure, the routing rule is transmitted by using a new parameter in the Update Bearer Request message, but this is not limited. The routing rule may also be transmitted by using a bearer context in the Update Bearer Request message, or may be transmitted by using a PCO in the Update Bearer Request message. In this embodiment, for example, the routing rule is transmitted only by using the Update Bearer Request.

Step 304: The S-GW sends the routing rule to an MME by using the Update Bearer Request.

Step 305: The MME sends the routing rule to a base station eNB by using a downlink NAS transport message. A NAS message in the Downlink NAS transport message carries the routing rule. The routing rule may be stored as a new parameter in the NAS message, but this is not limited. The routing rule may also be stored in a PCO in the NAS message.

Step 306: After receiving the Downlink NAS transport message carrying the routing rule, the eNB directly sends a NAS message carrying the routing rule to the UE.

Step 307: After the UE receives the updated routing rule, the UE acknowledges the routing rule, and transmits an acknowledged routing rule to the eNB by using a NAS message.

For the first extended routing rule provided by this embodiment of the present disclosure, the UE may modify a routing rule in which a negotiation indication included in the routing rule is a "negotiation allowed" identifier. For the second extended routing rule provided by this embodiment of the present disclosure, the UE may modify a routing rule (negotiable routing rule) in which a routing access technology indication included in the routing rule is not a specified value.

The UE may modify, according to at least one of configuration information of the UE or a current network status, the foregoing routing rule that can be modified. Generally, the UE modifies a routing access technology in the routing rule to an access technology selected by the UE, for example, 3GPP or WLAN. For a routing rule that does not need to be modified or cannot be modified, the UE keeps an original routing entry unchanged.

After the UE completes the acknowledgement, the UE sends updated routing rules including the unchanged routing rule and a modified routing rule to the network side.

For example, the UE receives 10 routing rules, and modifies two routing rules in the routing rules according to the configuration of the UE. Finally, routing rules updated by the UE are eight unchanged routing rules and two modified routing rules. The UE sends the 10 updated routing rules to the network side.

When sending the unchanged routing rules to the network side, the UE may further send identifiers of the unchanged routing rules to the network side, so as to save network resources.

Step 308: After receiving the updated routing rule, the eNB sends the updated routing rule to the MME by using an uplink NAS Transport message.

In this embodiment of the present disclosure, the updated routing rule is transmitted as a separate parameter by using a NAS message in the Uplink NAS Transport message or transmitted by using a PCO in a NAS message.

Step 309: After receiving the updated routing rule, the MME sends the updated routing rule to the S-GW by sending an Update Bearer Response message.

Step 310: The S-GW sends the received updated routing rule to the PGW by using the Update Bearer Response.

Step 311: The P-GW sends an IP-CAN Session Modification message to the hPCRF, and sends routing information negotiated with the UE, namely, the routing rule updated by the UE, to the hPCRF.

Step 312: The P-GW initiates a subsequent bearer creation procedure, bearer update procedure, or bearer deletion procedure based on the updated routing rule acknowledged by the UE.

For example, for a data flow, the updated routing rule indicates that the data flow is to be transmitted on the 3GPP side, but the 3GPP side currently has no bearer for transmitting the data flow. In this case, the P-GW initiates a bearer creation procedure or bearer update procedure on the 3GPP side, that is, sends a Create Bearer Request message or an Update Bearer Request to the S-GW and the MME for creating or modifying a dedicated bearer. A specific operation is the same as that in an existing procedure, and is not described herein.

For example, for a data flow, the updated routing rule indicates that the data flow is to be transmitted on the non-3GPP side, but the 3GPP side currently has a dedicated bearer corresponding to the data flow. In this case, the P-GW first initiates a bearer creation procedure or a bearer update procedure on the non-3GPP side, and then deletes corresponding dedicated bearer in the 3GPP network, that is, sends a Delete Bearer Request to the S-GW and the MME for deleting the dedicated bearer. A specific operation is the same as that in an existing procedure, and is not described herein.

The example 1 is applicable to a network architecture in which 3GPP and non-3GPP networks are interconnected. However, this embodiment of the present disclosure may also be used in an architecture in which a 2/3G network and a non-3GPP network are interconnected. In this architecture, the new routing rule generated by the P-GW may be sent to the UE by using a Modify PDP Context Request.

In this embodiment of the present disclosure, a new routing rule may be sent from the 3GPP side to the UE, or a new routing rule may be sent from the non-3GPP side to the UE. In this case, a specified signaling message is required to transmit the routing rule. For example, if the routing rule is sent from the non-3GPP side to the UE, a new message between a TWAN and the UE needs to be defined for performing interaction. For example, a WLCP NB_I-FOM Request/Response message is defined, and the routing rule is added to the message.

It should be noted that, for all procedures related to transmission of an extended routing rule, related procedures need to be extended and enhanced to support transmission of the extended routing rule.

Figure 4A:
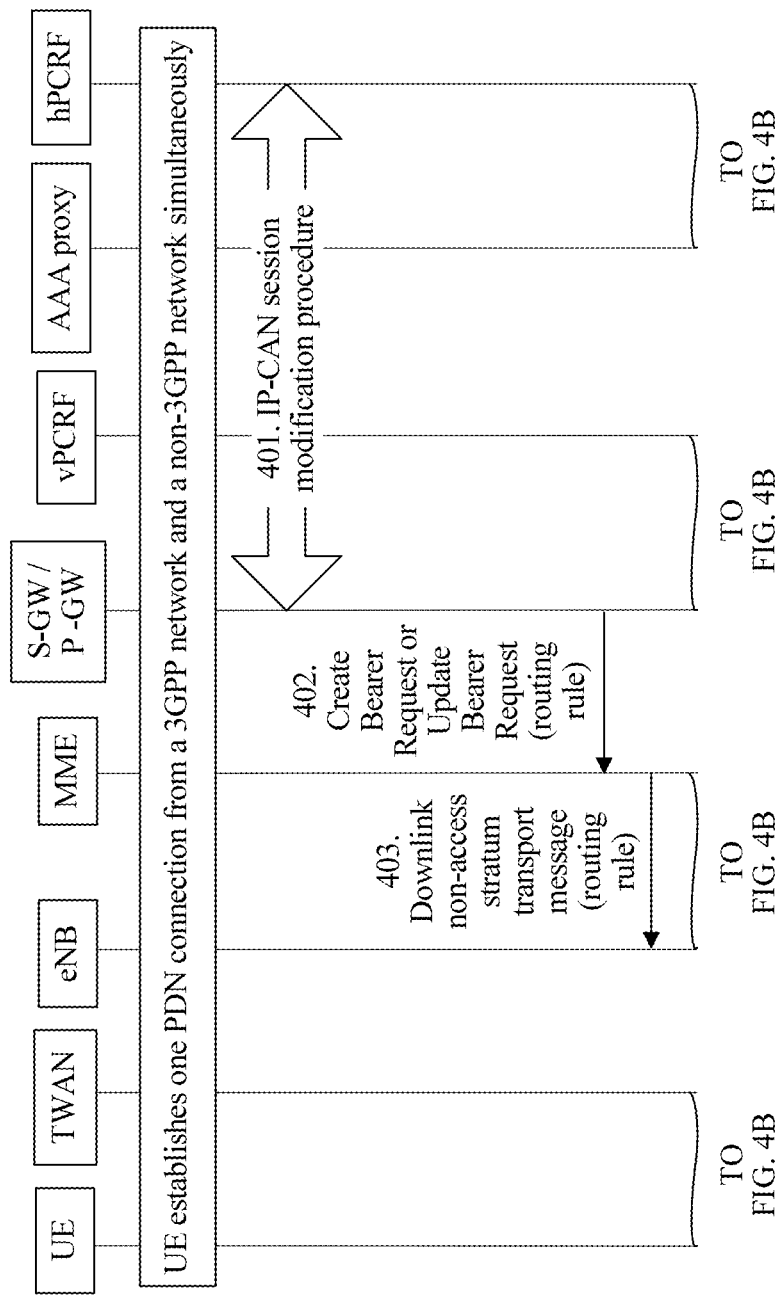
FIG. 4A and FIG. 4B are a flowchart of a second offloading policy negotiation example according to an embodiment of the present disclosure.
Figure 4B:
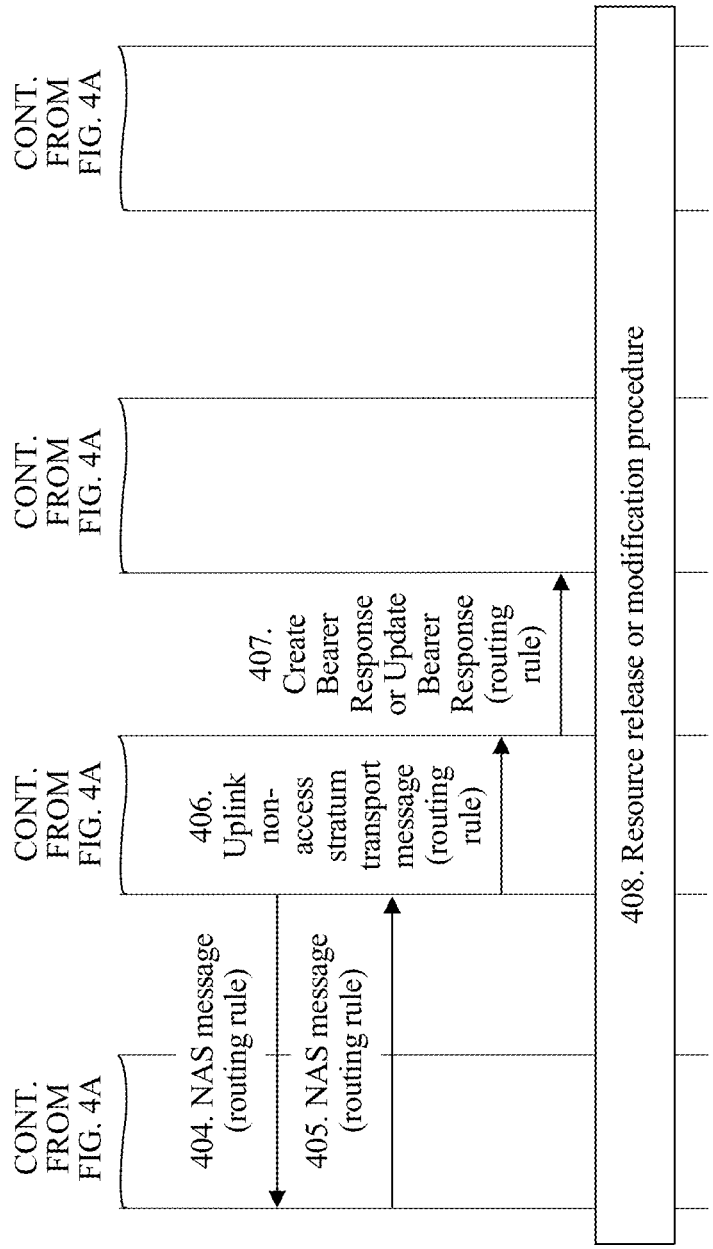

In an example 2, an embodiment of the present disclosure provides another routing rule negotiation mechanism initiated by a network side. The network side and UE perform routing rule negotiation by using a bearer creation procedure or a bearer update procedure. Referring to FIG. 4A and FIG. 4B, a specific procedure for routing rule negotiation is as follows:

First, the UE establishes one PDN connection from a 3GPP network and a non-3GPP network, namely, a TWAN, simultaneously.

Step 401: An hPCRF initiates an IP-CAN Session Modification process, modifies parameters of some data flows, for example, modifies an access technology of a data flow from 3GPP to non-3GPP, and generates a new routing rule.

A P-GW decides to create or modify a routing rule based on at least one of rule information (such as a PCC rule) delivered by the hPCRF, local configuration information, a current network status, or the like, so as to generate a new routing rule, and initiates a subsequent bearer creation procedure or bearer update procedure according to the new routing rule. For example, for a data flow, a new routing rule generated by the P-GW indicates that the data flow is to be transmitted on a 3GPP side, but the 3GPP side currently has no bearer for transmitting the data flow. In this case, the P-GW initiates a bearer creation procedure or bearer update procedure on the 3GPP side, that is, sends a Create Bearer Request message or an Update Bearer Request to the S-GW for creating or modifying a dedicated bearer.

The bearer creation procedure or the bearer modification or update procedure may be trigger on the 3GPP side, or may be triggered on a non-3GPP side, or may be triggered on both the 3GPP side and a non-3GPP side. This is not limited in this embodiment of the present disclosure. In this embodiment, in the example 2, the bearer creation procedure or the bearer update procedure performed on the 3GPP side is used only as an example.

Specifically, the new routing rule generated by the P-GW is, for example, the first extended routing rule or the second extended routing rule provided by the foregoing embodiment. A quantity of new routing rules generated by the P-GW may be one or more.

Step 402: A P-GW sends a Create Bearer Request or an Update Bearer Request to an S-GW, and the S-GW sends a Create Bearer Request or an Update Bearer Request to an MME. The Create Bearer Request or the Update Bearer Request carries the new routing rule generated by the P-GW.

Specifically, the Create Bearer Request or the Update Bearer Request further carries created or updated Traffic Flow Template (TFT) information, where the TFT information includes related flow description information.

For example, if a dedicated bearer on the 3GPP side needs to be created for a data flow based on the routing rule, a TFT carrying the data flow description information is sent in the Create Bearer Request message, where the TFT includes at least one of the following parameters: a source or destination IP address of the data flow, a source or destination port number, a used protocol type, or the like.

For another example, if a dedicated bearer on the 3GPP side needs to be modified for a data flow based on the routing rule, a TFT carrying the data flow description information is sent in the Update Bearer Request message, where the TFT also includes at least one of the following parameters: a source or destination IP address of the data flow, a source or destination port number, a used protocol type, or the like.

In this embodiment of the present disclosure, the routing rule is transmitted by using a separate parameter in the Create Bearer Request or the Update Bearer Request, but this is not limited. The routing rule may also be transmitted by using a bearer context in the Create Bearer Request or the Update Bearer Request, or may be transmitted by using a PCO in the Create Bearer Request or the Update Bearer Request. In this embodiment, for example, the routing rule is transmitted only by using the Update Bearer Request.

Step 403: The MME sends the routing rule to an eNB by using a Downlink NAS transport message.

Specifically, the MME transmits the routing rule by using a NAS message in the Downlink NAS transport message, where the NAS message in the Downlink NAS transport message carries the routing rule. The routing rule may be stored as a new parameter in the NAS message, but this is not limited. The routing rule may also be stored in a PCO in the NAS message.

The created or modified TFT is further sent when the routing rule is sent.

Step 404: After receiving the Downlink NAS transport message carrying the routing rule, the eNB directly sends the routing rule to UE by using a NAS message.

The eNB further sends the created or modified TFT when sending the routing rule.

The NAS message carries the routing rule. The routing rule may be stored as a new parameter in the NAS message, but this is not limited. The routing rule may also be stored in a PCO in the NAS message.

Step 405: After receiving the routing rule, the UE acknowledges the routing rule, and after completing the acknowledgement, the UE sends an updated routing rule to the eNB by using a NAS message.

A process in which the UE acknowledges the received routing rule is the same as step 307, and is intended to modify only a routing rule in which a negotiation indication is a "negotiation allowed" identifier or an included routing access technology indication is not a specified value. This is not described again herein.

After the UE completes the acknowledgement, the UE sends updated routing rules including an unchanged routing rule and a modified routing rule to the network side.

In addition, the UE decides, based on the acknowledged routing rule, whether to accept the bearer creation procedure or the bearer update procedure initiated by the network side.

For example, if a feature of a data flow corresponding to the bearer creation procedure or the bearer update procedure initiated by the network side matches flow description information in a routing rule that cannot be modified, the UE accepts the bearer creation procedure or bearer update procedure; otherwise, the UE may reject the bearer creation procedure or the bearer update request. When the UE selects the non-3GPP network as a transmission channel of the corresponding data flow in the bearer creation procedure or the bearer update procedure, the UE adds a special cause value to indicate that the network side rejects the bearer creation procedure and the bearer update procedure. The special cause value may be UE refuses (an existing cause value), IP traffic remove, N3GPP preferred, or the like. This is not limited in this embodiment of the present disclosure.

Step 406: After receiving the updated routing rule, the eNB sends the updated routing rule to the MME by using an Uplink NAS Transport message.

In this embodiment of the present disclosure, the updated routing rule may be transmitted as a separate parameter in a NAS message, or may be transmitted by using a PCO.

Step 407: After receiving the updated routing rule, the MME sends the updated routing rule to the S-GW or P-GW by sending a Create Bearer Response or an Update Bearer Response.

The Create Bearer Response or Update Bearer Response message not only carries the routing rule acknowledged by the UE, but also further includes a message processing result, that is, whether the bearer creation procedure or the bearer update procedure is accepted by the UE. If the UE rejects the bearer creation procedure or the bearer update procedure, the MME, the S-GW, and the P-GW further need to delete a created bearer or recover a modified bearer based on the cause value indicated by the UE. A specific operation is the same as that in an existing procedure, and is not described in this embodiment.

A network architecture in the example 2 is the same as that in the example 1, and both are network architectures in which 3GPP and non-3GPP networks are interconnected. However, this embodiment of the present disclosure may also be used in an architecture in which a 2/3G network and a non-3GPP network are interconnected. In this architecture, the new routing rule generated by the P-GW may be sent to the UE by using a Modify PDP Context Request.

In this embodiment of the present disclosure, a new routing rule may be sent from the 3GPP side to the UE, or a new routing rule may be sent from the non-3GPP side to the UE. In this case, a specified signaling message is required to transmit the routing rule. For example, if the new routing rule is sent from the non-3GPP side to the UE, a new message between a TWAN and the UE needs to be defined for performing interaction. For example, a WLCP Create Bearer Request/Response or a WLCP Update Bearer Request/Response message is defined, and the routing rule is added to the message.

It should be noted that, for all procedures related to transmission of an extended routing rule, related procedures need to be extended and enhanced to support transmission of the extended routing rule.

Figure 5:
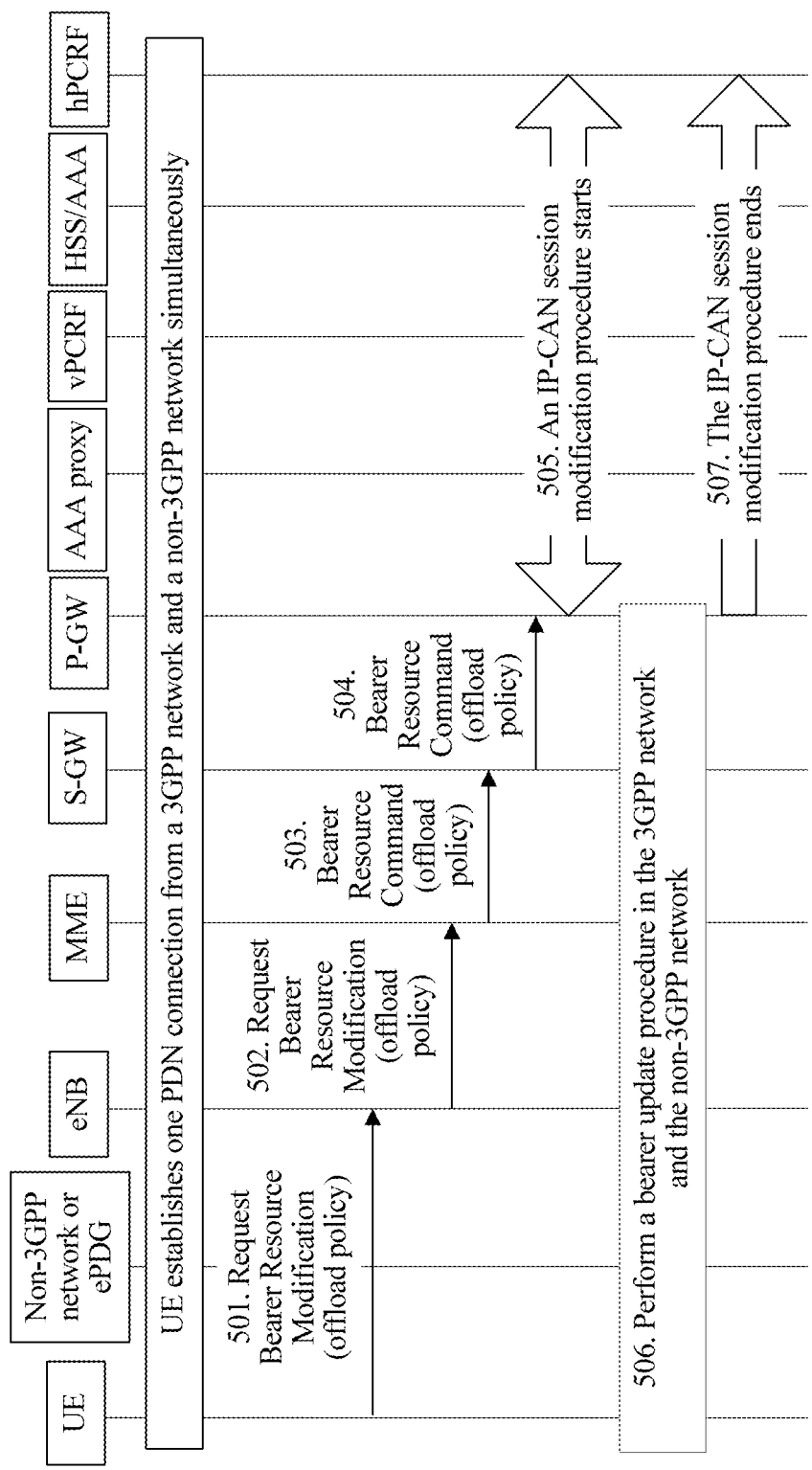
FIG. 5 is a flowchart of a third offloading policy negotiation example according to an embodiment of the present disclosure.

In an example 3, an embodiment of the present disclosure further provides an offloading policy negotiation mechanism initiated by UE. The UE and a network side perform offloading policy negotiation by using a bearer update procedure. Referring to FIG. 5, a specific procedure for offloading policy negotiation is as follows:

First, the UE establishes one PDN connection from a 3GPP network and a non-3GPP network simultaneously.

Step 501: UE generates at least one of a new routing rule or a default access indication according to at least one of configuration information of the UE or a current network status; the UE sends a Request Bearer Resource Modification message to an eNB.

An offloading policy negotiation process initiated by the UE may be performed on a 3GPP side, or performed on a non-3GPP side, or performed on a 3GPP side and a non-3GPP side simultaneously. This is not limited in this embodiment of the present disclosure. In this embodiment, the process initiated on the 3GPP side is used only as an example.

Specifically, the new routing rule generated by the UE is, for example, the first extended routing rule or the second extended routing rule provided by the foregoing embodiment. A quantity of new routing rules generated by the UE may be one or more. If the new routing rule generated by the UE is the first extended routing rule, a negotiation indication included in the routing rule is null. If the new routing rule generated by the UE is the second extended routing rule, a priority of a routing access technology included in the routing rule is not a specified value, that is, the new routing rule generated by the UE is a negotiable routing rule. In addition, if the UE needs to update a default access technology, the UE sends a default access technology indication in a PCO to the network side.

The Request Bearer Resource Modification message sent by the UE not only includes a new offloading policy generated by the UE, but also includes bearer resource modification information such as a traffic aggregate description (TAD).

In this embodiment of the present disclosure, the offloading policy is transmitted by using a separate parameter in a Request Bearer Resource Modification NAS message, but this not limited. The offloading policy may also be transmitted by using a PCO in the NAS message.

Step 502: The eNB continues to send received bearer modification information such as an offloading policy and a TAD to an MME by using the Request Bearer Resource Modification message.

Step 503: The MME continues to send the received bearer modification information such as the offloading policy and the TAD to an S-GW by using a Bearer Resource Command message.

Step 504: The S-GW continues to send the received bearer modification information such as the offloading policy and the TAD to a P-GW by using the Bearer Resource Command message.

Step 505: After receiving the offloading policy, the P-GW initiates an IP-CAN session modification process.

Specifically, the P-GW notifies an hPCRF of routing information of the data flow based on the new offloading policy generated by the UE, and after the hPCRF decides an offloading policy for the data flow, the hPCRF notifies the P-GW.

Step 506: The P-GW acknowledges, based on at least one of rule information (such as a charging policy) delivered by an hPCRF, indication information sent by the UE, local configuration information, a current network status, or the like, and sends an offloading policy acknowledged by the P-GW to the UE in a subsequently initiated bearer creation procedure or bearer update procedure.

In the process of acknowledging the routing rule generated by the UE, the P-GW may not modify a routing rule that is not forcibly executed by the network side but keeps it unchanged, but may modify a routing rule that is not supported by the network side, and set the routing rule after the modification to a nonnegotiable routing rule. For example, if the routing rule is the first extended routing rule, the P-GW sets a negotiation indication in the routing rule to a "negotiation forbidden" identifier; if the routing rule is the second extended routing rule, the P-GW sets a routing access technology indication in the routing rule to a specified value, that is, a case in which the network side does not allow a access technology to transmit a data flow is excluded, and other routing policies keep consistent with a routing policy requested by the UE.

In the process in which the P-GW acknowledges the default access indication generated by the UE, when the P-GW determines that at least one of the received rule information, the local configuration information, or the current network status does not match the default access indication, the P-GW modifies the default access indication, and uses a modified default access indication as an acknowledged default access indication; otherwise, the P-GW skips modifying the default access indication, and uses the unmodified default access indication as an acknowledged default access indication.

Step 507: The P-GW indicates that the IP-CAN Session Modification process ends.

A network architecture in the example 3 is the same as those in the example 1 and the example 2, and all are network architectures in which 3GPP and non-3GPP networks are interconnected. However, this embodiment of the present disclosure may also be used in an architecture in which a 2/3G network and a non-3GPP network are interconnected. In this architecture, the offloading policy acknowledged by the P-GW may be sent to the UE by using a Modify PDP Context Request.

It should be noted that, for all procedures related to transmission of an extended routing rule, related procedures need to be extended and enhanced to support transmission of the extended routing rule.

Figure 6A:
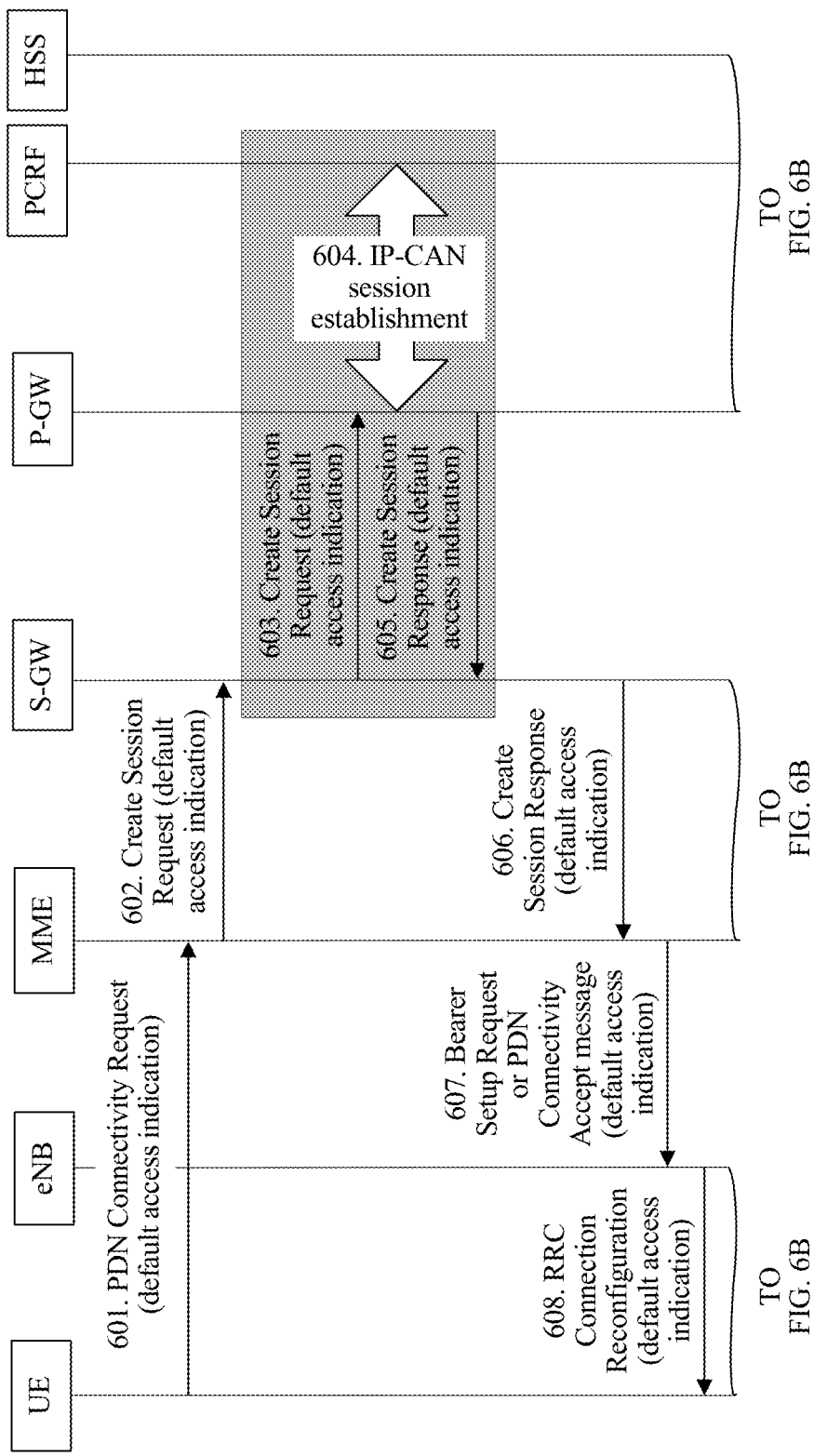
FIG. 6A and FIG. 6B are a flowchart of a fourth offloading policy negotiation example according to an embodiment of the present disclosure.
Figure 6B:
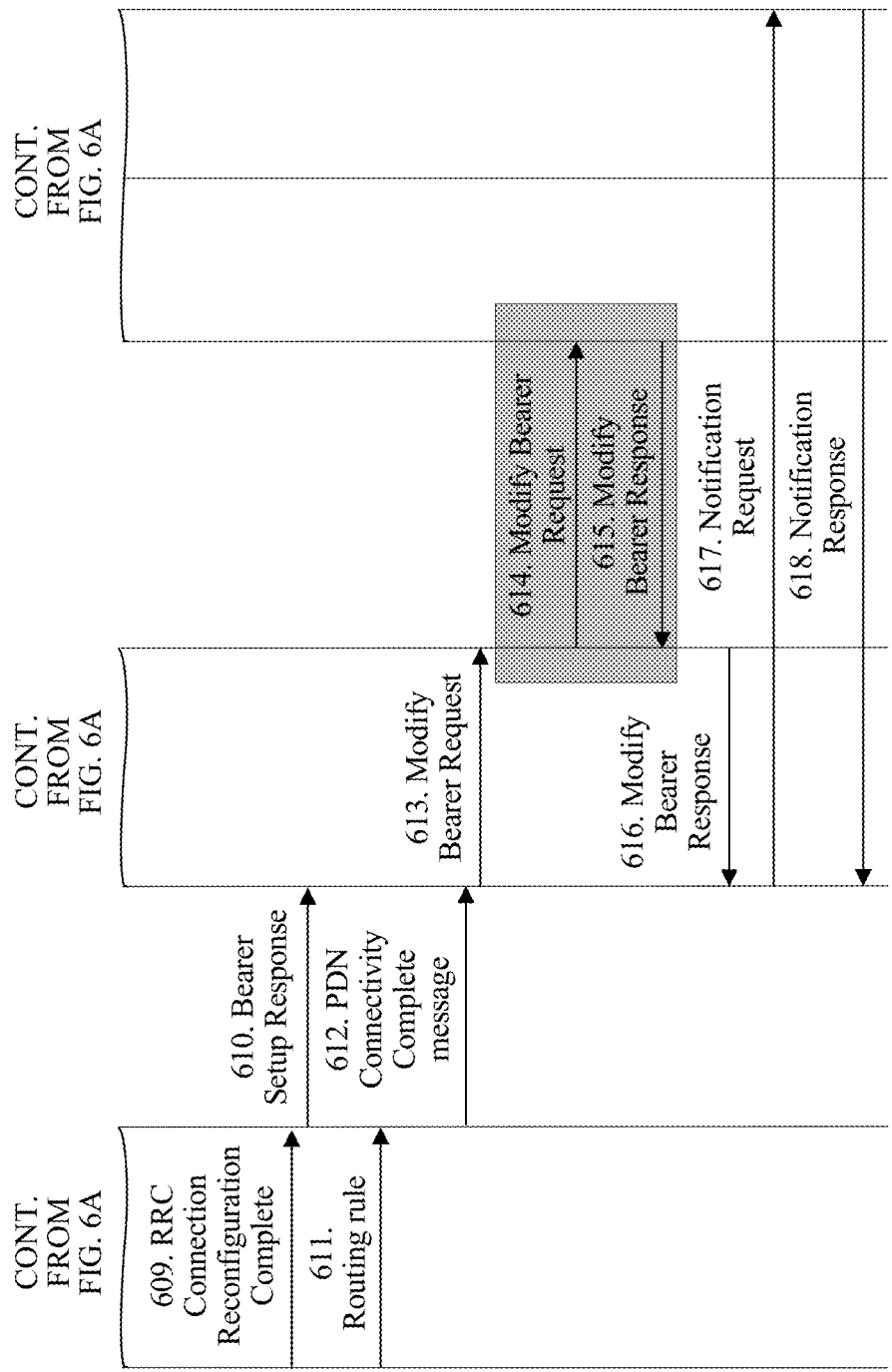

In an example 4, an embodiment of the present disclosure further provides a routing rule negotiation mechanism initiated by UE. The UE performs default access indication negotiation with a network side by performing a PDN connection establishment procedure on a 3GPP side. Referring to FIG. 6A and FIG. 6B, a specific procedure for default access indication negotiation is as follows:

The UE starts to initiate a PDN connection establishment procedure on the 3GPP side. In this case, the UE may have established a PDN connection on the non-3GPP side, or the UE has not established a PDN connection on the non-3GPP side. This is not limited in this embodiment of the present disclosure.

Step 601: UE generates a default access indication according to configuration information of the UE; and the UE initiates a PDN connection establishment procedure on a 3GPP side, and sends a PDN Connectivity Request to an MME, where a PCO included in the PDN Connectivity Request message carries the default access indication generated by the UE.

Specifically, the default access indication generated by the UE indicates that a routing access technology in the default access indication is used for transmission when a service flow does not match any routing rule.

Step 602: After receiving the PDN Connectivity Request sent by the UE, the MME sends a Create Session Request carrying the default access indication to an S-GW.

Step 603: The S-GW continues to send the Create Session Request carrying the default access indication to a P-GW.

Step 604: In an IP-CAN session establishment procedure between the P-GW and a PCRF, the PCRF sends, to the P-GW, routing policy information corresponding to a data flow.

Step 605: The P-GW acknowledges, based on at least one of rule information (such as a charging policy) delivered by the PCRF, indication information sent by the UE, local configuration information, a current network status, or the like, the received default access indication generated by the UE, and sends a Create Session Response to send a default access indication acknowledged by the P-GW to the S-GW.

In this embodiment, a routing rule acknowledged by the P-GW may be transmitted by using a Create Session Response, or by using PDN Connectivity Accept, a Create Bearer Request, a Bearer Setup Request, a NAS message, or the like.

Step 606: The S-GW continues to send the Create Session Response to send the default access indication acknowledged by the P-GW to the MME.

Step 607: The MME sends a PCO including the default access indication to the UE by using a NAS message.

Step 609: The UE receives the acknowledged default access indication sent by a network side.

Specifically, when the default access indication is transmitted, the default access indication is transmitted by using a message carrying a PCO, that is, all messages for transmitting the default access indication includes a PCO, where the PCO carries the default access indication.

Figure 7:
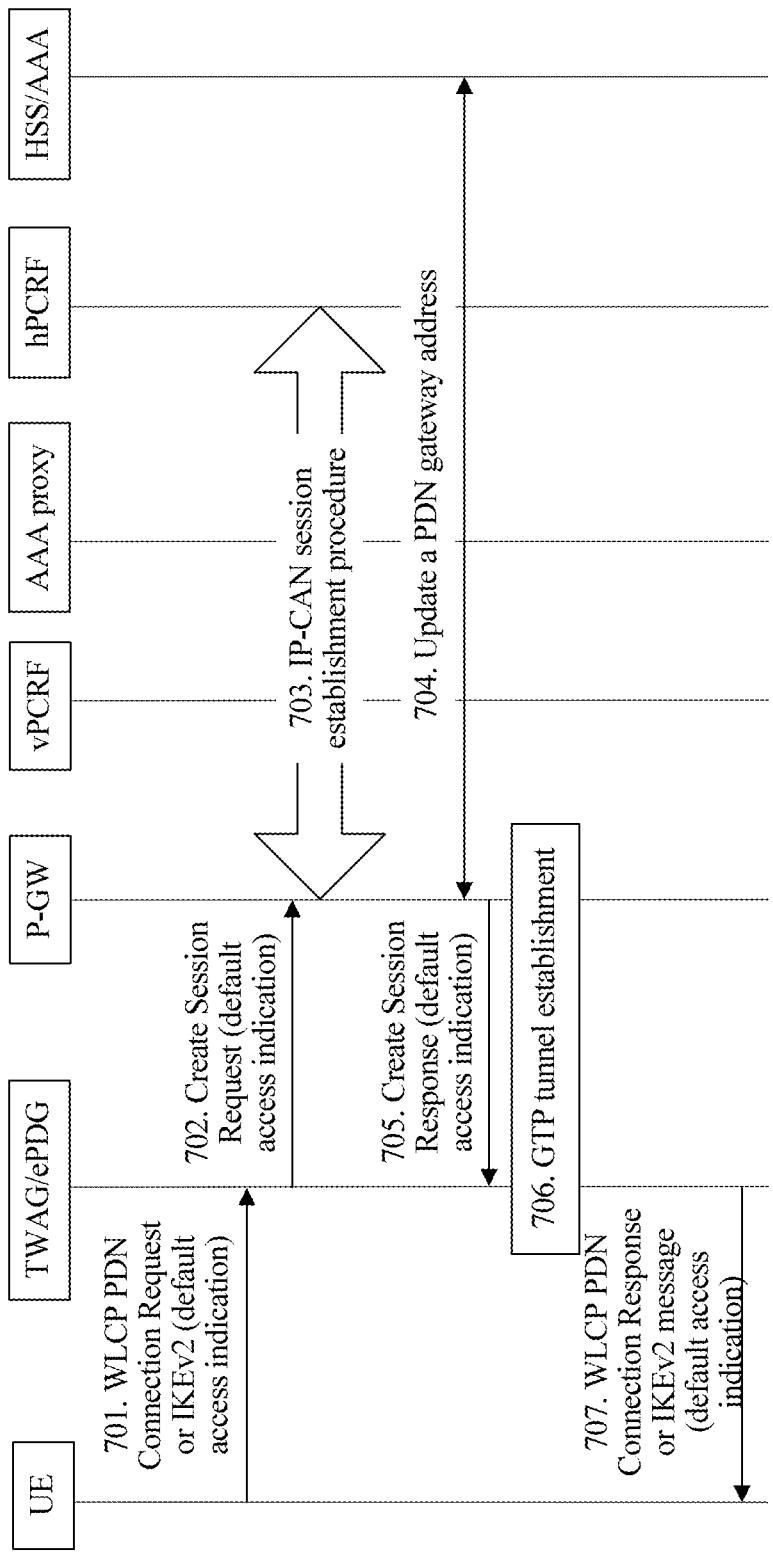
FIG. 7 is a flowchart of a fifth offloading policy negotiation example according to an embodiment of the present disclosure.

In an example 5, an embodiment of the present disclosure further provides a default access indication negotiation mechanism initiated by UE. The UE performs default access indication negotiation with a network side by performing a PDN connection establishment procedure on a non-3GPP side. Referring to FIG. 7, a specific procedure for default access indication negotiation is as follows:

Step 701: UE generates a default access indication according to at least one of configuration information of the UE or a current network status; and as in the prior art, the UE initiates a PDN connection establishment procedure in a non-3GPP network such as a WLAN side, that is, the UE sends a WLCP PDN Connection Request to a TWAG, where the WLCP PDN Connection Request carries the default access indication generated by the UE, or the UE sends an IKEv2 message to an ePDG, where the IKEv2 message carries the default access indication generated by the UE.

Step 702: The TWAG or the ePDG sends a Create Session Request carrying the default access indication to a P-GW.

Step 703: In an IP-CAN session establishment procedure between the P-GW and an hPCRF, the hPCRF sends, to the P-GW, routing policy information corresponding to a data flow.

Step 704: The P-GW updates a PDN gateway address to an HSS.

Step 705: The P-GW acknowledges, based on at least one of rule information (such as a charging policy) delivered by the hPCRF, indication information sent by the UE, local configuration information, a current network status, or the like, the received default access indication generated by the UE, and sends a Create Session Response to send a default access indication acknowledged by the P-GW to the TWAG or the ePDG.

The P-GW may further initiate a bearer creation procedure or a bearer update procedure to send the acknowledged default access indication to the UE.

Specifically, in the process of acknowledging the default access indication generated by the UE, the P-GW may not modify a default access indication that is not forcibly executed by the network side but keeps it unchanged, but may modify a default access indication that is not supported by the network side.

Step 706: A GTP tunnel is established between the TWAG/ePDG and the P-GW.

Step 707: The TWAG sends, to the UE by using a WLCP PDN Connection Response message, the acknowledged default access indication sent by the P-GW, or the ePDG sends, to the UE by using IKEv2 message, the acknowledged default access indication sent by the P-GW.

Specifically, when the default access indication is transmitted, the default access indication is transmitted by using a message carrying a PCO in all messages for transmitting the default access indication except the IKEv2 message, that is, all message for transmitting the default access indication includes a PCO, where the PCO carries the default access indication. In the IKEV2 message, the default access indication is transmitted as a new parameter.

Figure 8:
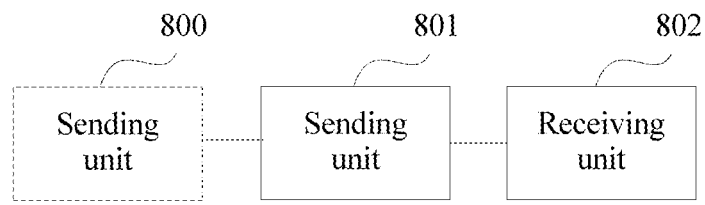
FIG. 8 is a structural diagram of an offloading policy negotiation apparatus on a first device side according to an embodiment of the present disclosure.

Based on the foregoing embodiment, referring to FIG. 8, an embodiment of the present disclosure further provides an offloading policy negotiation apparatus. The apparatus includes a sending unit 801 and a receiving unit 802.

The sending unit 801 is configured to send an offloading policy to a second device, where the offloading policy includes at least one of the following: a default access indication or at least one routing rule.

The receiving unit 802 is configured to receive and store an acknowledged offloading policy returned for the offloading policy by the second device, and transmit a data flow based on the acknowledged offloading policy.

Optionally, the offloading policy negotiation apparatus is a core network device or UE.

Optionally, the offloading policy negotiation apparatus further includes:

a generation unit 800, configured to generate the offloading policy before the sending unit 801 sends the offloading policy to the second device, where the generation unit 800 is specifically configured to:

when the offloading policy negotiation apparatus is the core network device, the generation unit 800 generates the at least one routing rule as the offloading policy according to at least one of received rule information, indication information sent by the UE, local configuration information, or a current network status; or when the offloading policy negotiation apparatus is the UE, the generation unit 800 generates at least one of the at least one routing rule or the default access indication as the offloading policy according to at least one of configuration information of the offloading policy negotiation apparatus or a current network status.

Optionally, the routing rule includes a routing access technology, flow description information, a negotiation indication, and first routing rule identifier information, where the first routing rule identifier information is at least one of a rule name or a rule priority; or the routing rule includes a routing access technology, flow description information, a routing access technology indication, and second routing rule identifier information, where the second routing rule identifier information is at least one of a rule name or a rule priority.

Optionally, when the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

Optionally, when the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

Optionally, a rule priority of a routing rule corresponding to a routing access technology indication that is a "forbidden" value is higher than a rule priority of a routing rule corresponding to a routing access technology indication that is an "allowed" value.

Optionally, when the offloading policy negotiation apparatus is the UE, the negotiation indication in the routing rule is null; or the routing access technology indication included in the routing rule is equal to the "allowed" value.

Optionally, when the offloading policy negotiation apparatus is the core network device, the sending unit 801 is specifically configured to:

the sending unit 801 adds the routing rule to an Update Bearer Request or a Create Bearer Request for transmission to a mobility management entity MME, so that after the MME receives the routing rule, the MME adds the routing rule to a non-access stratum NAS message for transmission to the second device; or the sending unit 801 adds the routing rule to an Update Bearer Request or a Create Bearer Request for transmission to a trusted access gateway TWAG, so that after the TWAG receives the routing rule, the TWAG adds the routing rule to a specified Wireless Local Area Network Control Plane Protocol WLCP message for transmission to the second device; or the sending unit 801 adds the routing rule to an Update Bearer Request or a Create Bearer Request for transmission to an untrusted access gateway ePDG, so that after the ePDG receives the routing rule, the ePDG adds the routing rule to an IKEv2 message for transmission to the second device; or the sending unit 801 adds the routing rule to a Modify PDP Context Request or a Create PDP Request for sending to the second device.

Optionally, when adding the routing rule to the Update Bearer Request or the Create Bearer Request for transmission, the sending unit 801 is specifically configured to:

the sending unit 801 adds the routing rule as a new parameter to the Update Bearer Request or the Create Bearer Request for transmission; or the sending unit 801 adds the routing rule to a bearer context in the Update Bearer Request or the Create Bearer Request for transmission; or the sending unit 801 adds the routing rule to a protocol configuration option PCO in the Update Bearer Request or the Create Bearer Request for transmission.

Optionally, when causing the MME to add the routing rule to the non-access stratum NAS message for transmission, the sending unit 801 is specifically configured to:

the sending unit 801 causes the MME to add the routing rule as a new parameter to the NAS message for transmission; or the sending unit 801 causes the MME to add the routing rule to a PCO in the NAS message for transmission.

Optionally, when the offloading policy negotiation apparatus is the UE, the sending unit 801 is specifically configured to:

when the offloading policy includes the routing rule, the sending unit 801 adds the offloading policy to a NAS message for sending to an MME, so that after the MME receives the offloading policy, the MME adds the offloading policy to a Bearer Resource Command for sending to the second device; or when the offloading policy is the default access indication, the sending unit 801 adds the default access indication to a NAS message for sending to an MME, so that after the MME receives the default access indication, the MME adds the default access indication to a Create Session Request for sending to the second device; or the sending unit 801 adds the default access indication to a WLCP packet data network PDN Connection Request for sending to a TWAG so that after the TWAG receives the default access indication, the TWAG adds the default access indication to a Create Session Request for sending to the second device; or the sending unit 801 adds the default access indication to an IKEv2 message for sending to an untrusted access gateway ePDG, so that after the ePDG receives the default access indication, the ePDG adds the default access indication to a Create Session Request for sending to the second device.

Optionally, when the offloading policy includes the routing rule, when adding the offloading policy to the NAS message for sending, the sending unit 801 is specifically configured to:

the sending unit 801 adds the offloading policy as a new parameter to the NAS message for sending; or the sending unit 801 adds the offloading policy to a PCO in the NAS message for sending.

Optionally, when the offloading policy is the default access indication, when adding the default access indication to the NAS message or the WLCP PDN Connection Request for sending, the sending unit 801 is specifically configured to:

the sending unit 801 adds the default access indication to a PCO in the NAS message or the WLCP PDN Connection Request for sending; or when the offloading policy is the default access indication, when causing the MME or the TWAG to add the default access indication to the Create Session Request for sending, the sending unit 801 is specifically configured to:

the sending unit 801 causes the MME or the TWAG to add the default access indication to a PCO in the Create Session Request for sending; or when the offloading policy is the default access indication, when adding the default access indication to the IKEv2 message for sending, the sending unit 801 is specifically configured to:

the sending unit 801 adds the default access indication as a new parameter to the IKEv2 message for sending.

Optionally, when the offloading policy negotiation apparatus is the core network device, the receiving unit 802 is specifically configured to:

if the second device modifies at least one routing rule in the received routing rules according to at least one of configuration information of the second device or a current network status, the receiving unit 802 receives other routing rules and an updated routing rule that are sent by the second device, where the other routing rules are unmodified rules in the routing rules, and the updated routing rule is obtained after the at least one routing rule is modified; or if the second device does not modify the received routing rules, the receiving unit 802 receives the unmodified routing rules.

Optionally, a negotiation indication included in the at least one routing rule modified by the second device is a "negotiation allowed" identifier; or a routing access technology indication included in the at least one routing rule modified by the second device is equal to an "allowed" value.

Optionally, the receiving unit 802 is further configured to:

receive a determining result generated by the second device based on the acknowledged offloading policy, in a bearer update procedure or a bearer creation or modification procedure.

Optionally, when the offloading policy negotiation apparatus is the UE, the receiving unit 802 is specifically configured to:

the receiving unit 802 receives at least one of an acknowledged routing rule or an acknowledged default access indication returned by the second device.

When receiving the acknowledged default access indication returned by the second device, the receiving unit 802 is specifically configured to:

if the second device modifies the received default access indication according to at least one of received rule information, indication information sent by the UE, local configuration information, or a current network status, the receiving unit 802 receives a modified default access indication returned by the second device; or if the second device does not modify the default access indication, the receiving unit 802 receives the unmodified default access indication returned by the second device.

When receiving the acknowledged routing rule returned by the second device, the receiving unit 802 is specifically configured to:

if the second device modifies at least one routing rule in the received routing rules according to at least one of the received rule information, the indication information sent by the UE, the local configuration information, or the current network status, the receiving unit 802 receives other routing rules and an updated routing rule that are sent by the second device, where the other routing rules are unmodified rules in the routing rules, and the updated routing rule is obtained after the at least one routing rule is modified; or if the second device does not modify the received routing rules, the receiving unit 802 receives the unmodified routing rules.

Optionally, a negotiation indication included in the updated routing rule obtained after the at least one routing rule is modified is a "negotiation forbidden" identifier; or a routing access technology indication included in the updated routing rule obtained after the at least one routing rule is modified is a "forbidden" value.

Figure 9:
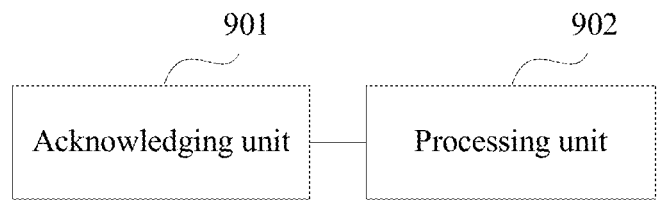
FIG. 9 is a structural diagram of an offloading policy negotiation apparatus on a second device side according to an embodiment of the present disclosure.

Based on the foregoing embodiment, referring to FIG. 9, an embodiment of the present disclosure further provides an offloading policy negotiation apparatus. The apparatus includes an acknowledging unit 901 and a processing unit 902.

The acknowledging unit 901 is configured to receive an offloading policy sent by a first device, and acknowledge the offloading policy, where the offloading policy includes at least one of the following: a default access indication or at least one routing rule.

The processing unit 902 is configured to store an acknowledged offloading policy, return the acknowledged offloading policy to the first device, and transmit a data flow based on the acknowledged offloading policy.

Optionally, the offloading policy negotiation apparatus is UE or a core network device.

Optionally, when the offloading policy negotiation apparatus is the UE, the offloading policy is the at least one routing rule sent by the first device; or when the offloading policy negotiation apparatus is the core network device, the offloading policy is at least one of the at least one routing rule or the default access indication sent by the first device.

Optionally, the routing rule sent by the first device includes a routing access technology, flow description information, a negotiation indication, and first routing rule identifier information, where the first routing rule identifier information is at least one of a rule name or a rule priority; or the routing rule sent by the first device includes a routing access technology, flow description information, a routing access technology indication, and second routing rule identifier information, where the second routing rule identifier information is at least one of a rule name or a rule priority.

Optionally, when the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

Optionally, when the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

Optionally, a rule priority of a routing rule corresponding to a routing access technology indication that is a "forbidden" value is higher than a rule priority of a routing rule corresponding to a routing access technology indication that is an "allowed" value.

Optionally, when the first device is the UE, the negotiation indication in the routing rule sent by the first device is null; or the routing access technology indication in the routing rule sent by the first device is equal to the "allowed" value.

Optionally, when the offloading policy negotiation apparatus is the UE, the acknowledging unit 901 is configured to:

acknowledge the routing rule.

When acknowledging the routing rule, the acknowledging unit 901 is specifically configured to:

when the acknowledging unit 901 determines that at least one of configuration information of the offloading policy negotiation apparatus or a current network status does not match at least one routing rule in the routing rules, and that the at least one routing rule is not a nonnegotiable routing rule, modify the at least one routing rule, generate an updated routing rule after the modification, and use other routing rules that are unmodified in the routing rules and the updated routing rule that is obtained after the at least one routing rule is modified, as acknowledged routing rules; or when the acknowledging unit 901 determines that at least one of configuration information of the offloading policy negotiation apparatus or a current network status matches all routing rules in the routing rules, or that a routing rule not matching at least one of configuration information of the offloading policy negotiation apparatus or a current network status, in the routing rules, is a nonnegotiable routing rule, skip modifying the routing rule, and use the unmodified routing rules as acknowledged routing rules.

Optionally, when the offloading policy negotiation apparatus is the core network device, the acknowledging unit 901 is configured to:

acknowledge the default access indication in the offloading policy, and/or acknowledge the routing rule in the offloading policy.

When acknowledging the default access indication, the acknowledging unit 901 is specifically configured to:

when the acknowledging unit 901 determines that at least one of received rule information, indication information sent by the UE, local configuration information, or a current network status does not match the default access indication, modify the default access indication, and use a modified default access indication as an acknowledged default access indication; or when the acknowledging unit 901 determines that received rule information, indication information sent by the UE, local configuration information, and a current network status match the default access indication, skip modifying the default access indication, and use the unmodified default access indication as an acknowledged default access indication.

When acknowledging the routing rule, the acknowledging unit 901 is specifically configured to:

when the acknowledging unit 901 determines that at least one of the received rule information, the indication information sent by the UE, the local configuration information, or the current network status does not match at least one routing rule in the routing rules, modify the at least one routing rule, generate an updated routing rule after the modification, and use other routing rules that are unmodified in the routing rules and the updated routing rule that is obtained after the at least one routing rule is modified, as acknowledged routing rules; or when the acknowledging unit 901 determines that the received rule information, the indication information sent by the UE, the local configuration information, and the current network status match all routing rules in the routing rules, skip modifying the routing rules, and use the unmodified routing rules as acknowledged routing rules.

Optionally, when modifying the at least one routing rule, the acknowledging unit 901 is specifically configured to:

the acknowledging unit 901 modifies a routing access technology included in the at least one routing rule; and when the at least one routing rule includes a negotiation indication, set the negotiation indication included in the at least one routing rule to a "negotiation forbidden" identifier, or when the at least one routing rule includes a routing access technology indication, set the routing access technology indication included in the at least one routing rule to a "forbidden" value.

Optionally, when the offloading policy negotiation apparatus is the UE, the processing unit 902 is specifically configured to:

the processing unit 902 adds the acknowledged routing rule to a non-access stratum NAS message for transmission to a mobility management entity MME, so that after the MME receives the acknowledged routing rule, the MME adds the acknowledged routing rule to an Update Bearer Response or a Create Bearer Response for transmission to the first device; or the processing unit 902 adds the acknowledged routing rule to a specified Wireless Local Area Network Control Plane Protocol WLCP message for transmission to a trusted access gateway TWAG, so that after the TWAG receives the acknowledged routing rule, the TWAG adds the acknowledged routing rule to an Update Bearer Response or a Create Bearer Response for transmission to the first device; or the processing unit 902 adds the acknowledged routing rule to an IKEv2 message for transmission to an untrusted access gateway ePDG, so that after the ePDG receives the acknowledged routing rule, the ePDG adds the acknowledged routing rule to an Update Bearer Response or a Create Bearer Response for transmission to the first device.

Optionally, when adding the acknowledged routing rule to the NAS message for transmission to the MME, the processing unit 902 is specifically configured to:

the processing unit 902 adds the acknowledged routing rule as a new parameter to the NAS message for transmission to the MME; or the processing unit 902 adds the acknowledged routing rule to a protocol configuration option PCO in the NAS message for transmission to the MME.

Optionally, when causing the MME, the TWAG, or the ePDG to add the acknowledged routing rule to the Update Bearer Response or the Create Bearer Response for transmission to the first device, the processing unit 902 is specifically configured to:

the processing unit 902 causes the MME, the TWAG, or the ePDG to add the acknowledged routing rule as a new parameter to the Update Bearer Response or the Create Bearer Response for transmission to the first device; or the processing unit 902 causes the MME, the TWAG, or the ePDG to add the acknowledged routing rule to a bearer context in the Update Bearer Response or the Create Bearer Response for transmission to the first device; or the processing unit 902 causes the MME, the TWAG, or the ePDG to add the acknowledged routing rule to a PCO in the Update Bearer Response or the Create Bearer Response for transmission to the first device.

Optionally, the processing unit 902 is further configured to:

send a determining result generated by the offloading policy negotiation apparatus based on the acknowledged offloading policy, in a bearer update procedure or a bearer creation or modification procedure.

Optionally, when the offloading policy negotiation apparatus is the core network device, the processing unit 902 is specifically configured to:

when the acknowledged offloading policy includes the acknowledged routing rule, the processing unit 902 adds the acknowledged offloading policy to an Update Bearer Request or a Create Bearer Request for transmission to an MME, so that after the MME receives the acknowledged offloading policy, the MME adds the acknowledged offloading policy to a NAS message for transmission to the first device; or the processing unit 902 adds the acknowledged offloading policy to a Modify PDP Context Request or a Create PDP Context Request for sending to the first device; or when the acknowledged offloading policy is the acknowledged default access indication, the processing unit 902 adds the acknowledged default access indication to a Create Session Response for sending to an MME, so that after the MME receives the acknowledged default access indication, the MME adds the acknowledged default access indication to a NAS message for sending to the first device; or the processing unit 902 adds the acknowledged default access indication to a Create Session Response for sending to a trusted access gateway TWAG, so that after the TWAG receives the acknowledged default access indication, the TWAG adds the acknowledged default access indication to a Wireless Local Area Network Control Plane Protocol WLCP packet data network PDN Connection Response for sending to the first device; or the processing unit 902 adds the acknowledged default access indication to a Create Session Response for sending to an untrusted access gateway ePDG, so that after the ePDG receives the acknowledged default access indication, the ePDG adds the acknowledged default access indication to an IKEv2 message for sending to the first device.

Optionally, when the acknowledged offloading policy includes the acknowledged routing rule, when causing the MME to add the acknowledged offloading policy to the NAS message for transmission to the first device, the processing unit 902 is specifically configured to:

the processing unit 902 causes the MME to add the acknowledged offloading policy as a new parameter to the NAS message for transmission to the first device; or the processing unit 902 causes the MME to add the acknowledged offloading policy to a PCO in the NAS message for transmission to the first device.

Optionally, when the acknowledged offloading policy is the acknowledged default access indication, when adding the acknowledged default access indication to the Create Session Response for sending, the processing unit 902 is specifically configured to:

the processing unit 902 adds the acknowledged default access indication to a PCO in the Create Session Response for sending;

when the acknowledged offloading policy is the acknowledged default access indication, when causing the MME to add the acknowledged default access indication to the NAS message for sending, the processing unit 902 is specifically configured to:

the processing unit 902 causes the MME to add the acknowledged default access indication to a PCO in the NAS message for sending;

when the acknowledged offloading policy is the acknowledged default access indication, when causing the TWAG to add the acknowledged default access indication to the WLCP PDN Connection Response for sending, the processing unit 902 is specifically configured to:

the processing unit 902 causes the TWAG to add the acknowledged default access indication to a PCO in the WLCP PDN Connection Response for sending; and when the acknowledged offloading policy is the acknowledged default access indication, when causing the ePDG to add the acknowledged default access indication to the IKEv2 message for sending, the processing unit 902 is specifically configured to:

the processing unit 902 causes the ePDG to add the acknowledged default access indication as a new parameter to the IKEv2 message for sending.

Figure 10:
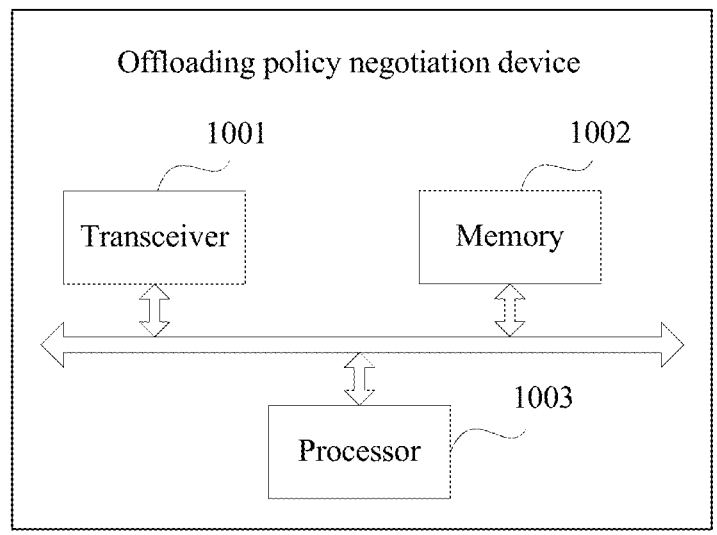
FIG. 10 is a structural diagram of an offloading policy negotiation device on a first device side according to an embodiment of the present disclosure.

Based on the foregoing embodiment, referring to FIG. 10, an embodiment of the present disclosure further provides an offloading policy negotiation device. The device includes a transceiver 1001, a memory 1002, and a processor 1003.

The transceiver 1001 is configured to send an offloading policy to a second device, where the offloading policy includes at least one of the following: a default access indication or at least one routing rule; and receive an acknowledged offloading policy returned for the offloading policy by the second device.

The memory 1002 is configured to store the acknowledged offloading policy returned for the offloading policy by the second device and store a program.

The processor 1003 is configured to transmit a data flow according to the acknowledged offloading policy that is returned for the offloading policy by the second device and stored in the memory 1002.

Optionally, the offloading policy negotiation device is a core network device or UE.

The processor 1003 is configured to generate the offloading policy before the transceiver 1001 sends the offloading policy to the second device, and the processor 1003 is specifically configured to:

when the offloading policy negotiation device is the core network device, the processor 1003 generates the at least one routing rule as the offloading policy according to at least one of received rule information, indication information sent by the UE, local configuration information, or a current network status; or when the offloading policy negotiation device is the UE, the processor 1003 generates at least one of the at least one routing rule or the default access indication as the offloading policy according to at least one of configuration information of the offloading policy negotiation device or a current network status.

Optionally, the routing rule includes a routing access technology, flow description information, a negotiation indication, and first routing rule identifier information, where the first routing rule identifier information is at least one of a rule name or a rule priority; or the routing rule includes a routing access technology, flow description information, a routing access technology indication, and second routing rule identifier information, where the second routing rule identifier information is at least one of a rule name or a rule priority.

Optionally, when the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

Optionally, when the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

Optionally, a rule priority of a routing rule corresponding to a routing access technology indication that is a "forbidden" value is higher than a rule priority of a routing rule corresponding to a routing access technology indication that is an "allowed" value.

Optionally, when the offloading policy negotiation device is the UE, the negotiation indication in the routing rule is null; or the routing access technology indication included in the routing rule is equal to the "allowed" value.

Optionally, when the offloading policy negotiation device is the core network device, the transceiver 1001 is specifically configured to:

the transceiver 1001 adds the routing rule to an Update Bearer Request or a Create Bearer Request for transmission to a mobility management entity MME, so that after the MME receives the routing rule, the MME adds the routing rule to a non-access stratum NAS message for transmission to the second device; or the transceiver 1001 adds the routing rule to an Update Bearer Request or a Create Bearer Request for transmission to a trusted access gateway TWAG, so that after the TWAG receives the routing rule, the TWAG adds the routing rule to a specified Wireless Local Area Network Control Plane Protocol WLCP message for transmission to the second device; or the transceiver 1001 adds the routing rule to an Update Bearer Request or a Create Bearer Request for transmission to an untrusted access gateway ePDG, so that after the ePDG receives the routing rule, the ePDG adds the routing rule to an IKEv2 message for transmission to the second device; or the transceiver 1001 adds the routing rule to a Modify PDP Context Request or a Create PDP Request for sending to the second device.

Optionally, when adding the routing rule to the Update Bearer Request or the Create Bearer Request for transmission, the transceiver 1001 is specifically configured to:

the transceiver 1001 adds the routing rule as a new parameter to the Update Bearer Request or the Create Bearer Request for transmission; or the transceiver 1001 adds the routing rule to a bearer context in the Update Bearer Request or the Create Bearer Request for transmission; or the transceiver 1001 adds the routing rule to a protocol configuration option PCO in the Update Bearer Request or the Create Bearer Request for transmission.

Optionally, when causing the MME to add the routing rule to the non-access stratum NAS message for transmission, the transceiver 1001 is specifically configured to:

the transceiver 1001 causes the MME to add the routing rule as a new parameter to the NAS message for transmission; or the transceiver 1001 causes the MME to add the routing rule to a PCO in the NAS message for transmission.

Optionally, when the offloading policy negotiation device is the UE, the transceiver 1001 is specifically configured to:

when the offloading policy includes the routing rule, the transceiver 1001 adds the offloading policy to a NAS message for sending to an MME, so that after the MME receives the offloading policy, the MME adds the offloading policy to a Bearer Resource Command for sending to the second device; or when the offloading policy is the default access indication, the transceiver 1001 adds the default access indication to a NAS message for sending to an MME, so that after the MME receives the default access indication, the MME adds the default access indication to a Create Session Request for sending to the second device; or the transceiver 1001 adds the default access indication to a WLCP packet data network PDN Connection Request for sending to a TWAG, so that after the TWAG receives the default access indication, the TWAG adds the default access indication to a Create Session Request for sending to the second device; or the transceiver 1001 adds the default access indication to an IKEv2 message for sending to an untrusted access gateway ePDG, so that after the ePDG receives the default access indication, the ePDG adds the default access indication to a Create Session Request for sending to the second device.

Optionally, when the offloading policy includes the routing rule, when adding the offloading policy to the NAS message for sending, the transceiver 1001 is specifically configured to:

the transceiver 1001 adds the offloading policy as a new parameter to the NAS message for sending; or the transceiver 1001 adds the offloading policy to a PCO in the NAS message for sending.

Optionally, when the offloading policy is the default access indication, when adding the default access indication to the NAS message or the WLCP PDN Connection Request for sending, the transceiver 1001 is specifically configured to:

the transceiver 1001 adds the default access indication to a PCO in the NAS message or the WLCP PDN Connection Request for sending; or when the offloading policy is the default access indication, when causing the MME or the TWAG to add the default access indication to the Create Session Request for sending, the transceiver 1001 is specifically configured to:

the transceiver 1001 causes the MME or the TWAG to add the default access indication to a PCO in the Create Session Request for sending; or when the offloading policy is the default access indication, when adding the default access indication to the IKEv2 message for sending, the transceiver 1001 is specifically configured to:

the transceiver 1001 adds the default access indication as a new parameter to the IKEv2 message for sending.

Optionally, when the offloading policy negotiation device is the core network device, the transceiver 1001 is specifically configured to:

if the second device modifies at least one routing rule in the received routing rules according to at least one of configuration information of the second device or a current network status, the transceiver 1001 receives other routing rules and an updated routing rule that are sent by the second device, where the other routing rules are unmodified rules in the routing rules, and the updated routing rule is obtained after the at least one routing rule is modified; or if the second device does not modify the received routing rules, the transceiver 1001 receives the unmodified routing rules.

Optionally, a negotiation indication included in the at least one routing rule modified by the second device is a "negotiation allowed" identifier; or a routing access technology indication included in the at least one routing rule modified by the second device is equal to an "allowed" value.

Optionally, the transceiver 1001 is further configured to:

receive a determining result generated by the second device based on the acknowledged offloading policy, in a bearer update procedure or a bearer creation or modification procedure.

Optionally, when the offloading policy negotiation device is the UE, the transceiver 1001 is specifically configured to:

the transceiver 1001 receives at least one of an acknowledged routing rule or an acknowledged default access indication returned by the second device.

When receiving the acknowledged default access indication returned by the second device, the transceiver 1001 is specifically configured to:

if the second device modifies the received default access indication according to at least one of received rule information, indication information sent by the UE, local configuration information, or a current network status, the transceiver 1001 receives a modified default access indication returned by the second device; or if the second device does not modify the default access indication, the transceiver 1001 receives the unmodified default access indication returned by the second device.

When receiving the acknowledged routing rule returned by the second device, the transceiver 1001 is specifically configured to:

if the second device modifies at least one routing rule in the received routing rules according to at least one of the received rule information, the indication information sent by the UE, the local configuration information, or the current network status, the transceiver 1001 receives other routing rules and an updated routing rule that are sent by the second device, where the other routing rules are unmodified rules in the routing rules, and the updated routing rule is obtained after the at least one routing rule is modified; or if the second device does not modify the received routing rules, the transceiver 1001 receives the unmodified routing rules.

Optionally, a negotiation indication included in the updated routing rule obtained after the at least one routing rule is modified is a "negotiation forbidden" identifier; or a routing access technology indication included in the updated routing rule obtained after the at least one routing rule is modified is a "forbidden" value.

Figure 11:
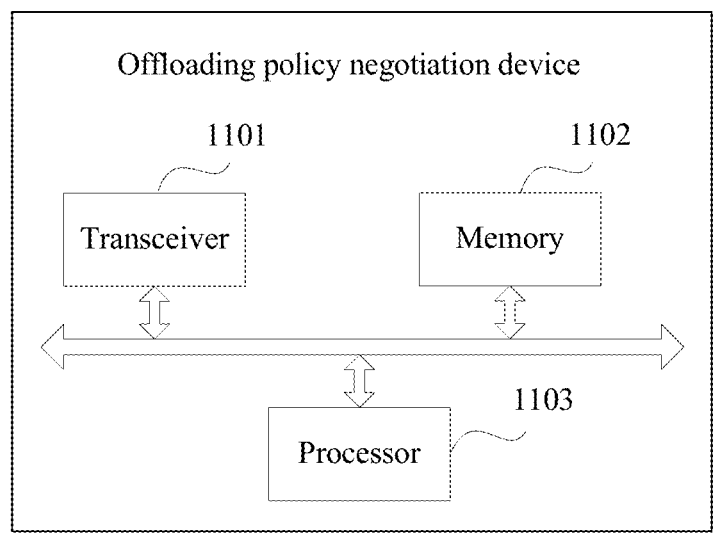
FIG. 11 is a structural diagram of an offloading policy negotiation device on a second device side according to an embodiment of the present disclosure.

Based on the foregoing embodiment, referring to FIG. 11, an embodiment of the present disclosure further provides an offloading policy negotiation device. The device includes a transceiver 1101, a memory 1102, and a processor 1103.

The transceiver 1101 is configured to receive an offloading policy sent by a first device, and return an acknowledged offloading policy to the first device, where the offloading policy includes at least one of the following: a default access indication or at least one routing rule.

The memory 1102 is configured to store the acknowledged offloading policy, and store a program.

The processor 1103 is configured to acknowledge the offloading policy, and transmit a data flow based on the acknowledged offloading policy.

Optionally, the offloading policy negotiation device is UE or a core network device.

Optionally, when the offloading policy negotiation device is the UE, the offloading policy is the at least one routing rule sent by the first device; or when the offloading policy negotiation apparatus is the core network device, the offloading policy is at least one of the at least one routing rule or the default access indication sent by the first device.

Optionally, the routing rule sent by the first device includes a routing access technology, flow description information, a negotiation indication, and first routing rule identifier information, where the first routing rule identifier information is at least one of a rule name or a rule priority; or the routing rule sent by the first device includes a routing access technology, flow description information, a routing access technology indication, and second routing rule identifier information, where the second routing rule identifier information is at least one of a rule name or a rule priority.

Optionally, when the routing rule includes the routing access technology, the flow description information, the negotiation indication, and the first routing rule identifier information, the negotiation indication is used to identify permission of the UE for modifying the routing rule, and a value is a "negotiation allowed" identifier or a "negotiation forbidden" identifier, where when the value of the negotiation indication is the "negotiation allowed" identifier, it indicates that the UE selects the routing access technology in the routing rule or another access technology, or when the value of the negotiation indication is the "negotiation forbidden" identifier, it indicates that the UE selects the routing access technology in the routing rule; or when the routing rule includes the routing access technology, the flow description information, the routing access technology indication, and the second routing rule identifier information, the routing access technology indication is used to identify permission for using the routing access technology in the routing rule, and a value is a "forbidden" value or an "allowed" value, where when the value of the routing access technology indication is the "forbidden" value, it indicates that using the routing access technology in the routing rule is forbidden, or when the value of the routing access technology indication is the "allowed" value, it indicates that using the routing access technology in the routing rule is allowed.

Optionally, when the value of the negotiation indication is the "negotiation forbidden" identifier, it indicates that the routing rule to which the negotiation indication belongs is a nonnegotiable routing rule; or when the value of the routing access technology indication is the "forbidden" value, it indicates that the routing rule to which the routing access technology indication belongs is a nonnegotiable routing rule.

Optionally, a rule priority of a routing rule corresponding to a routing access technology indication that is a "forbidden" value is higher than a rule priority of a routing rule corresponding to a routing access technology indication that is an "allowed" value.

Optionally, when the first device is the UE, the negotiation indication in the routing rule sent by the first device is null; or the routing access technology indication in the routing rule sent by the first device is equal to the "allowed" value.

Optionally, when the offloading policy negotiation device is the UE, the processor 1103 is configured to:

acknowledge the routing rule.

When acknowledging the routing rule, the processor 1103 is specifically configured to:

when the processor 1103 determines that at least one of configuration information of the offloading policy negotiation device or a current network status does not match at least one routing rule in the routing rules, and that the at least one routing rule is not a nonnegotiable routing rule, modify the at least one routing rule, generate an updated routing rule after the modification, and use other routing rules that are unmodified in the routing rules and the updated routing rule that is obtained after the at least one routing rule is modified, as acknowledged routing rules; or when the processor 1103 determines that at least one of configuration information of the offloading policy negotiation device or a current network status matches all routing rules in the routing rules, or that a routing rule not matching at least one of configuration information of the offloading policy negotiation device or a current network status, in the routing rules, is a nonnegotiable routing rule, skip modifying the routing rule, and use the unmodified routing rules as acknowledged routing rules.

Optionally, when the offloading policy negotiation device is the core network device, the processor 1103 is configured to:

acknowledge the default access indication in the offloading policy, and/or acknowledge the routing rule in the offloading policy.

When acknowledging the default access indication, the processor 1103 is specifically configured to:

when the processor 1103 determines that at least one of received rule information, indication information sent by the UE, local configuration information, or a current network status does not match the default access indication, modify the default access indication, and use a modified default access indication as an acknowledged default access indication; or when the processor 1103 determines that received rule information, indication information sent by the UE, local configuration information, and a current network status match the default access indication, skip modifying the default access indication, and use the unmodified default access indication as an acknowledged default access indication.

When acknowledging the routing rule, the processor 1103 is specifically configured to:

when the processor 1103 determines that at least one of the received rule information, the indication information sent by the UE, the local configuration information, or the current network status does not match at least one routing rule in the routing rules, modify the at least one routing rule, generate an updated routing rule after the modification, and use other routing rules that are unmodified in the routing rules and the updated routing rule that is obtained after the at least one routing rule is modified, as acknowledged routing rules; or when the processor 1103 determines that the received rule information, the indication information sent by the UE, the local configuration information, and the current network status match all routing rules in the routing rules, skip modifying the routing rules, and use the unmodified routing rules as acknowledged routing rules.

Optionally, when modifying the at least one routing rule, the processor 1103 is specifically configured to:

the processor 1103 modifies a routing access technology included in the at least one routing rule; and when the at least one routing rule includes a negotiation indication, set the negotiation indication included in the at least one routing rule to a "negotiation forbidden" identifier, or when the at least one routing rule includes a routing access technology indication, set the routing access technology indication included in the at least one routing rule to a "forbidden" value.

Optionally, when the offloading policy negotiation device is the UE, the transceiver 1101 is specifically configured to:

the transceiver 1101 adds the acknowledged routing rule to a non-access stratum NAS message for transmission to a mobility management entity MME, so that after the MME receives the acknowledged routing rule, the MME adds the acknowledged routing rule to an Update Bearer Response or a Create Bearer Response for transmission to the first device; or the transceiver 1101 adds the acknowledged routing rule to a specified Wireless Local Area Network Control Plane Protocol WLCP message for transmission to a trusted access gateway TWAG; so that after the TWAG receives the acknowledged routing rule, the TWAG adds the acknowledged routing rule to an Update Bearer Response or a Create Bearer Response for transmission to the first device; or the transceiver 1101 adds the acknowledged routing rule to an IKEv2 message for transmission to an untrusted access gateway ePDG, so that after the ePDG receives the acknowledged routing rule, the ePDG adds the acknowledged routing rule to an Update Bearer Response or a Create Bearer Response for transmission to the first device.

Optionally, when adding the acknowledged routing rule to the NAS message for transmission to the MME, the transceiver 1101 is specifically configured to:

the transceiver 1101 adds the acknowledged routing rule as a new parameter to the NAS message for transmission to the MME; or the transceiver 1101 adds the acknowledged routing rule to a protocol configuration option PCO in the NAS message for transmission to the MME.

Optionally, when causing the MME, the TWAG, or the ePDG to add the acknowledged routing rule to the Update Bearer Response or the Create Bearer Response for transmission to the first device, the transceiver 1101 is specifically configured to:

the transceiver 1101 causes the MME, the TWAG, or the ePDG to add the acknowledged routing rule as a new parameter to the Update Bearer Response or the Create Bearer Response for transmission to the first device; or the transceiver 1101 causes the MME, the TWAG, or the ePDG to add the acknowledged routing rule to a bearer context in the Update Bearer Response or the Create Bearer Response for transmission to the first device; or the transceiver 1101 causes the MME, the TWAG, or the ePDG to add the acknowledged routing rule to a PCO in the Update Bearer Response or the Create Bearer Response for transmission to the first device.

Optionally, the transceiver 1101 is further configured to:

send a determining result generated by the offloading policy negotiation device based on the acknowledged offloading policy, in a bearer update procedure or a bearer creation or modification procedure.

Optionally, when the offloading policy negotiation device is the core network device, the transceiver 1101 is specifically configured to:

when the acknowledged offloading policy includes the acknowledged routing rule, the transceiver 1101 adds the acknowledged offloading policy to an Update Bearer Request or a Create Bearer Request for transmission to an MME, so that after the MME receives the acknowledged offloading policy, the MME adds the acknowledged offloading policy to a NAS message for transmission to the first device; or the transceiver 1101 adds the acknowledged offloading policy to a Modify PDP Context Request or a Create PDP Context Request for sending to the first device; or when the acknowledged offloading policy is the acknowledged default access indication, the transceiver 1101 adds the acknowledged default access indication to a Create Session Response for sending to an MME, so that after the MME receives the acknowledged default access indication, the MME adds the acknowledged default access indication to a NAS message for sending to the first device; or the transceiver 1101 adds the acknowledged default access indication to a Create Session Response for sending to a trusted access gateway TWAG, so that after the TWAG receives the acknowledged default access indication, the TWAG adds the acknowledged default access indication to a Wireless Local Area Network Control Plane Protocol WLCP packet data network PDN Connection Response for sending to the first device; or the transceiver 1101 adds the acknowledged default access indication to a Create Session Response for sending to an untrusted access gateway ePDG, so that after the ePDG receives the acknowledged default access indication, the ePDG adds the acknowledged default access indication to an IKEv2 message for sending to the first device.

Optionally, when the acknowledged offloading policy includes the acknowledged routing rule, when causing the MME to add the acknowledged offloading policy to the NAS message for transmission to the first device, the transceiver 1101 is specifically configured to:

the transceiver 1101 causes the MME to add the acknowledged offloading policy as a new parameter to the NAS message for transmission to the first device; or the transceiver 1101 causes the MME to add the acknowledged offloading policy to a PCO in the NAS message for transmission to the first device.

Optionally, when the acknowledged offloading policy is the acknowledged default access indication, when adding the acknowledged default access indication to the Create Session Response for sending, the transceiver 1101 is specifically configured to:

the transceiver 1101 adds the acknowledged default access indication to a PCO in the Create Session Response for sending;

when the acknowledged offloading policy is the acknowledged default access indication, when causing the MME to add the acknowledged default access indication to the NAS message for sending, the transceiver 1101 is specifically configured to:

the transceiver 1101 causes the MME to add the acknowledged default access indication to a PCO in the NAS message for sending;

when the acknowledged offloading policy is the acknowledged default access indication, when causing the TWAG to add the acknowledged default access indication to the WLCP PDN Connection Response for sending, the transceiver 1101 is specifically configured to:

the transceiver 1101 causes the TWAG to add the acknowledged default access indication to a PCO in the WLCP PDN Connection Response for sending; and when the acknowledged offloading policy is the acknowledged default access indication, when causing the ePDG to add the acknowledged default access indication to the IKEv2 message for sending, the transceiver 1101 is specifically configured to:

the transceiver 1101 causes the ePDG to add the acknowledged default access indication as a new parameter to the IKEv2 message for sending.

In summary, the embodiments of the present disclosure provide an offloading policy negotiation method and apparatus. The method is: a first device sends an offloading policy to a second device, where the offloading policy includes a default access indication and a routing rule; and the first device receives and stores an acknowledged offloading policy returned for the offloading policy by the second device, and transmits a data flow based on the acknowledged offloading policy. In this way, during updating of an offloading policy for a data flow, a routing rule that is acceptable to both sides can be obtained through negotiation between a network side and UE, transmission efficiency of the data flow is improved, and problems in the prior art that a method for initiating data flow switching by the UE has low applicability, and that the network side cannot control and manage the UE, and that user experience is reduced are resolved.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. An offloading policy negotiation method, comprising:
    establishing, by a user equipment (UE), a single packet data network (PDN) connection to both a $3^{rd}$ Generation Partnership Project (3GPP) network and a non-3GPP network;
    negotiating, by the UE with a core network device, a default access by:
        generating, by the UE, an indication for a first default access based on a network status of the PDN connection, wherein the UE generates the indication to indicate to the core network device that the UE proposes to use the first default access to transmit a data flow when none of one or more routing rules configured on the UE matches a data flow;
        sending, by the UE to the core network device, the indication for the first default access; and
        receiving, by the UE from the core network device, an acknowledged offloading policy, wherein the acknowledged offloading policy is associated with a second default access comprising a modification of the first default access based on the indication sent by the UE and configuration information in the core network device, wherein the first default access and the second default access are different from any of the one or more routing rules; and
    transmitting, by the UE, a first data flow based on the second default access when none of the one or more routing rules matches the first data flow.

2. The method according to claim 1, wherein sending the indication comprises:
    sending, by the UE, a non access stratum (NAS) message carrying the indication to a mobility management entity (MME), so that after the MME receives the indication, the MME sends a Create Session Request carrying the indication to the core network device.

3. The method according to claim 1, wherein a value of the indication is $3^{rd}$ Generation Partnership Project (3GPP) access or wireless local area network (WLAN) access.

4. The method according to claim 1, wherein the second default access is different than the first default access.

5. The method according to claim 1, wherein sending the indication comprises:
    sending, by the UE, a Wireless Local Area Network Control Plane Protocol (WLCP) packet data network (PDN) Connection Request carrying the indication to a trusted access gateway (TWAG), so that after the TWAG receives the indication, the TWAG sends a Create Session Request carrying the indication to the core network device.

6. The method according to claim 1, wherein sending the indication comprises:
    sending, by the UE, an Internet Key Exchange Protocol (IKEv2) message carrying the indication to an untrusted access gateway (ePDG), so that after the ePDG receives the indication, the ePDG sends a Create Session Request carrying the indication to the core network device.

7. An offloading policy negotiation apparatus, comprising:
    a transmitter;
    a receiver; and
    a processor configured to:
        establish a single packet data network (PDN) connection to both a $3^{rd}$ Generation Partnership Project (3GPP) network and a non-3GPP network;
        negotiate, with a core network device, a default access by:
            generating an indication for a first default access based on a network status of the PDN connection, wherein the indication is generated to indicate to a core network device that a user equipment (UE) proposes to use the first default access to transmit a data flow when none of one or more routing rules configured on the UE matches a data flow;
            sending, to a core network device using the transmitter, the indication for the first default access; and
            receiving, from the core network device using the receiver, an acknowledged offloading policy associated with a second default access comprising a modification of the first default access based on the indication sent by the transmitter and configuration information in the core network device, wherein the first default access and the second default access are different from any of the one or more routing rules; and
        transmit, using the transmitter, a first data flow based on the second default access when none of the one or more routing rules matches the first data flow.

8. The apparatus according to claim 7, wherein the processor is configured to:
    send, using the transmitter, a non access stratum (NAS) message carrying the indication to a mobility management entity (MME), so that after the MME receives the indication, the MME sends a Create Session Request carrying the indication to the core network device.

9. The apparatus according to claim 7, wherein a value of the indication is $3^{rd}$ Generation Partnership Project (3GPP) access or wireless local area network (WLAN) access.

10. The apparatus according to claim 7, wherein the second default access is different than the first default access.

11. The apparatus according to claim 7, wherein the processor is configured to:
    send, using the transmitter, a Wireless Local Area Network Control Plane Protocol (WLCP) packet data network (PDN) Connection Request carrying the indication to a trusted access gateway (TWAG), so that after the TWAG receives the indication, the TWAG sends a Create Session Request carrying the indication to the core network device.

12. The apparatus according to claim 7, wherein the processor is configured to:
    send, using the transmitter, an Internet Key Exchange Protocol (IKEv2) message carrying the indication to an untrusted access gateway (ePDG), so that after the ePDG receives the indication, the ePDG sends a Create Session Request carrying the indication to the core network device.

13. A non-transitory computer-readable medium comprising instructions that are executable by one or more processors, wherein the instructions instruct the one or more processors to:
    establish a single packet data network (PDN) connection to both a $3^{rd}$ Generation Partnership Project (3GPP) network and a non-3GPP network;
    negotiate, with a core network device, a default access by:
        generating an indication for a first default access based on a network status of the PDN connection, wherein the indication is generated to indicate to a core network device that a user equipment (UE) proposes to use the first default access to transmit a data flow when none of one or more routing rules configured on the UE matches a data flow;

sending, to a core network device, the indication for the first default access; and receiving, from the core network device, an acknowledged offloading policy, wherein the acknowledged offloading policy is associated with a second default access, the second default access comprises a modification of the first default access based on the sent indication and local configuration information, and wherein the first default access and the second default access are different from any of the one or more routing rules; and transmit a first data flow based on the second default access when none of the one or more routing rules matches the first data flow.

14. The non-transitory computer-readable medium according to claim 13, wherein, to send the indication, the one or more processors execute the instructions to:

send a non access stratum (NAS) message carrying the indication to a mobility management entity (MME), so that after the MME receives the indication, the MME sends a Create Session Request carrying the indication to the core network device.

15. The non-transitory computer-readable medium according to claim 13, wherein a value of the indication is $3^{rd}$ Generation Partnership Project (3GPP) access or wireless local area network (WLAN) access.

16. The non-transitory computer-readable medium according to claim 13, wherein the second default access is different than the first default access.

17. The non-transitory computer-readable medium according to claim 13, wherein, to send the indication, the one or more processors execute the instructions to:

send a Wireless Local Area Network Control Plane Protocol (WLCP) packet data network (PDN) Connection Request carrying the indication to a trusted access gateway (TWAG), so that after the TWAG receives the indication, the TWAG sends a Create Session Request carrying the indication to the core network device.

18. The non-transitory computer-readable medium according to claim 13, wherein, to send the indication, the one or more processors execute the instructions to:

send an Internet Key Exchange Protocol (IKEv2) message carrying the indication to an untrusted access gateway (ePDG), so that after the ePDG receives the indication, the ePDG sends a Create Session Request carrying the indication to the core network device.

* * * * *

UNITED STATES PATENT AND TRADEMARK OFFICE
CERTIFICATE OF CORRECTION

PATENT NO. : 11,178,057 B2  
APPLICATION NO. : 15/449028  
DATED : November 16, 2021  
INVENTOR(S) : Youyang Yu Page 1 of 1

It is certified that error appears in the above-identified patent and that said Letters Patent is hereby corrected as shown below:

On the Title Page

Item (71), Applicant; delete "Guangdong (CN)" and insert --Shenzhen (CN)--.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*